US012096056B2

(12) United States Patent
Singh et al.

(10) Patent No.: US 12,096,056 B2
(45) Date of Patent: Sep. 17, 2024

(54) PERSONALIZED CONTENT RECOMMENDATIONS FOR STREAMING PLATFORMS

(71) Applicant: Screening Room Media, Inc., West Hollywood, CA (US)

(72) Inventors: Man Jit Singh, West Hollywood, CA (US); Jonathan Smith, West Hollywood, CA (US); Sean Holahan, Long Beach, CA (US)

(73) Assignee: SR LABS, INC., West Hollywood, CA (US)

( * ) Notice: Subject to any disclaimer, the term of this patent is extended or adjusted under 35 U.S.C. 154(b) by 135 days.

(21) Appl. No.: 17/825,934

(22) Filed: May 26, 2022

(65) Prior Publication Data

US 2023/0412861 A1    Dec. 21, 2023

(51) Int. Cl.
*H04N 21/25* (2011.01)
*H04N 21/254* (2011.01)
(Continued)

(52) U.S. Cl.
CPC ....... *H04N 21/2541* (2013.01); *H04N 21/251* (2013.01); *H04N 21/25866* (2013.01)

(58) Field of Classification Search
None
See application file for complete search history.

(56) References Cited

U.S. PATENT DOCUMENTS 8,856,307 B2   10/2014  Capobianco
9,313,240 B2    4/2016  Su et al.
(Continued)

FOREIGN PATENT DOCUMENTS

KR     20210130583        11/2021
WO    WO-2023229787 A1    11/2023

OTHER PUBLICATIONS

"International Application Serial No. PCT US2023 020238, International Search Report mailed Aug. 22, 2023", 5 pages.
(Continued)

*Primary Examiner* — Brian T Pendleton
*Assistant Examiner* — Jean D Saint Cyr
(74) *Attorney, Agent, or Firm* — SCHWEGMAN LUNDBERG & WOESSNER, P.A.

(57) ABSTRACT

An example method of sharing content within a private group comprises implementing an instance of a content review application; establishing, in the implemented instance of the content review application, a private connection between two individual user accounts of the content review application included in the private group; collecting content feedback data from a first user account of the two individual user accounts within the private group, the content feedback data corresponding to a media product or a family of media products; determining, based on first user request, a first user-defined authorized class for the private group within a plurality of other user accounts having a private connection with the first user account; delivering first user-selected content, to the authorized class, the delivered content including one of the collected feedback data or a content recommendation corresponding to the content feedback data from the first user account; and establishing a reciprocity of limited access to the delivered content exclusively between the other user accounts of the authorized class.

20 Claims, 20 Drawing Sheets

(51) Int. Cl.
*H04N 21/258* (2011.01)
*H04N 21/2668* (2011.01)
*H04N 21/442* (2011.01)
*H04N 21/45* (2011.01)
*H04N 21/475* (2011.01)

(56) References Cited

U.S. PATENT DOCUMENTS

| | | |
|---|---|---|
| 2006/0282851 A1 | 12/2006 | Errico et al. |
| 2009/0119258 A1 | 5/2009 | Petty |
| 2009/0240771 A1* | 9/2009 | Capobianco ............ H04L 51/52 709/204 |
| 2012/0284638 A1 | 11/2012 | Cutler et al. |
| 2013/0191762 A1* | 7/2013 | Rajagopalan .......... G06Q 10/10 715/753 |
| 2014/0344289 A1 | 11/2014 | Berenson et al. |
| 2015/0304369 A1 | 10/2015 | Sandholm et al. |
| 2015/0358658 A1 | 12/2015 | Murphy et al. |
| 2016/0179808 A1 | 6/2016 | De Napoli Ferreira et al. |
| 2016/0205431 A1 | 7/2016 | Avedissian et al. |
| 2016/0357352 A1 | 12/2016 | Matas et al. |
| 2018/0167698 A1 | 6/2018 | Mercer et al. |
| 2019/0190875 A1 | 6/2019 | Dhariwal et al. |
| 2020/0021545 A1 | 1/2020 | Xiao |
| 2023/0388602 A1 | 11/2023 | Singh et al. |

OTHER PUBLICATIONS

"International Application Serial No. PCT US2023 020238, Written Opinion mailed Aug. 22, 2023", 5 pages.
"U.S. Appl. No. 17/825,871, Non Final Office Action mailed Nov. 9, 2023", 10 pgs.

* cited by examiner

PERSONALIZED CONTENT RECOMMENDATIONS FOR STREAMING PLATFORMS

TECHNICAL FIELD

The subject matter disclosed herein generally relates to the processing of data. More specifically, the present disclosure relates to systems and methods for curating and distributing personalized content recommendations in association with streaming platforms and other network-based content providers.

BACKGROUND

Social networks provide a forum for interconnecting, forming relationships, maintaining relationships, and communicating. The relationships modeled by social networks can include friendships, kinships, common interests, common pursuits, common habits, and the like. Social network systems can include recommendation systems for comparing characteristics of social network users and making recommendations for users based on a commonality of characteristics of the user and the subject of the recommendation. Sometimes, current recommendations systems are based on or reveal public "connections" between users in social groups. Automated publication of such connections while rendering automated recommendations can be unwelcome or undesired.

Current recommendations systems often fail to provide recommendation sets that are both contextually appropriate, insightful, and expansive in relation to a user query for experiential users, for whom browsing, engagement, and curated and individualized content are motivators.

SUMMARY

In some examples, a system comprises one or more computer processors; and one or more computer-readable mediums storing instructions that, when executed by the one or more computer processors, cause the system to perform operations comprising: implementing an instance of the content review application; sending, in the implemented content review application, to a second user account, based on a first user request, a declinable invitation to join the private group; establishing, upon an acceptance of the invitation by the second user, a private connection between a first user account of the first user and the second user account included in the private group, the private connection viewable in the content review application only by the first and second users; collecting content feedback data from the first user account within the private group, the content feedback data corresponding to a media product or a family of media products; and sharing, between the two user accounts only, one of the collected feedback data or a content recommendation corresponding to the content feedback data from the first user account.

In some examples, the operations further comprise collecting content consumption data including an index of media products at least partially consumed by the first user account within the private group; and prompting the first user account to provide content feedback data for each media product or a family of media products included in the index.

In some examples, collecting the content feedback data includes receiving a classification or ranking of at least one media product from the first user account.

In some examples, the content consumption data is collected or scraped from a plurality of content providers.

In some examples, the operations further comprise providing a user-searchable index of media product signifiers to the first user account within the private group, wherein collecting the content feedback data includes receiving a classification of at least one media product signifier from the first user account.

In some examples, a system comprises one or more computer processors; and one or more computer-readable mediums storing instructions that, when executed by the one or more computer processors, cause the system to perform operations comprising: implementing an instance of a content review application; establishing, in the implemented instance of the content review application, a private connection between two individual user accounts of the content review application included in the private group; collecting content feedback data from a first user account of the two individual user accounts within the private group, the content feedback data corresponding to a media product or a family of media products; determining, based on first user request, a first user-defined authorized class for the private group within a plurality of other user accounts having a private connection with the first user account; delivering first user-selected content, to the authorized class, the delivered content including one of the collected feedback data or a content recommendation corresponding to the content feedback data from the first user account; and establishing a reciprocity of limited access to the delivered content exclusively between the other user accounts of the authorized class.

In some examples, delivering the content occurs asynchronously with collecting the content feedback data.

In some examples, the operations further comprise predicting, via an algorithm, a class of the plurality of other user accounts that will be receptive to the collected feedback data or the content recommendation; and impeding delivery to users outside the predicted class.

In some examples, the predicting includes dynamically indexing respective feedback data from the plurality of other user accounts; and determining, for each user account in the plurality of other user accounts, an index of irrelevant categories based on the respective feedback data.

In some examples, the delivering includes prompting the first user account to select or deselect at least one of a plurality of candidate accounts, each of the candidate accounts having a private connection in the content review application with the first user account, to receive the collected feedback data or the content recommendation.

In some examples, prompting the first user account to select or deselect at least one of a plurality of candidate accounts occurs contemporaneously, concurrently, or simultaneously with collecting the content feedback data from the first user account.

In some examples, the operations further comprise collecting content feedback data from a second user account within the private group, the content feedback data corresponding to a media product or a family of media products; and delivering, to a plurality of user accounts having a private connection with the second user account, at least one of the collected feedback data or the content recommendation corresponding to the content feedback data from the second user account.

In some examples, the delivering includes prompting the second user account to select or deselect at least one of a plurality of candidate accounts, each of the candidate accounts having a private connection in the content review application with the first user account, to receive the collected feedback data or a content recommendation.

BRIEF DESCRIPTION OF THE DRAWINGS

Some embodiments are illustrated by way of example and not limitation in the figures of the accompanying drawings.

DETAILED DESCRIPTION

Example methods and systems are directed to sharing content, and more particularly to curating and distributing content recommendations in association with streaming platforms and other network-based content providers across social networks, and multiple category areas and products. Examples merely typify possible variations. Unless explicitly stated otherwise, components and functions may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Figure 1:
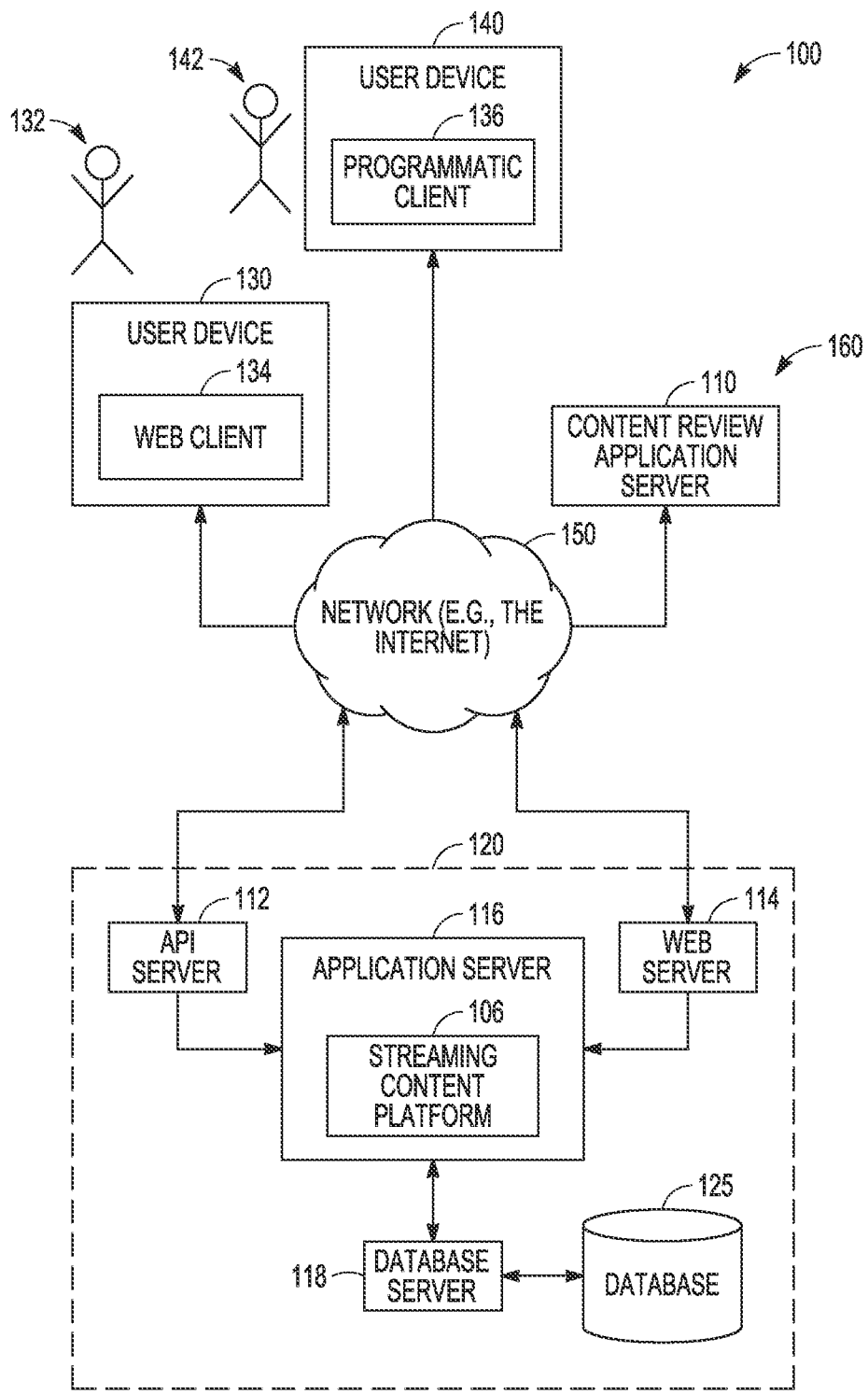
FIG. 1 is a network diagram illustrating a network environment, according to some example embodiments.

FIG. 1 is a network diagram illustrating a network environment 100 suitable for sharing content and curating and distributing curated recommendations across a social network and across multiple category areas and media products. The network environment 100 includes a content review application server 110, a publication system 120, and user devices 130 and 140, all communicatively coupled to each other via a network 150. The content review application server 110, explained in more detail with reference to FIG. 2, can form all or part of a network-based system 160 configured to receive a set of user interactions performed on a set of data objects, generate a set of associations between the set of data objects, identify a set of data object clusters, generate an organization for the set of data objects, and present a plurality of data objects for display. The data objects may include a media product, or a family of media products offered by the publication system 120, described more fully below.

Although shown as separate from the publication system 120, in some embodiments, the content review application server 110 can be included in the publication system 120 as a portion thereof. For example, the content review application server 110 can form one or more hardware components in communication with other components of the publication system 120. In some embodiments, the content review application server 110 could form one or more components of the publication system 120, implemented as a combination of hardware and software. For example, software forming a portion of the publication system 120 can include processor executable instructions which configure a processor of the publication system to perform operations of the content review application server 110 described herein.

The publication system 120 is shown as including an application programming interface (API) server 112, a web server 114, an application server 116, a database server 118, and the database 125. In some embodiments, the publication system 120 forms all or part of the network-based system 160 (e.g., a cloud-based server system configured to provide one or more content streaming services to the user devices 130 and 140). The content review application server 110, the publication system 120, and the user devices 130 and 140 may each be implemented in a computer system, in whole or in part, as described below with respect to FIG. 19. The API server 112 provides a programmatic interface by which the user devices 130 and 140 can access the application server 116 of the publication system 120.

The application server 116 may be implemented as a single application server 116 or a plurality of application servers. The application server 116, as shown, hosts a streaming content platform 180 (such as Netflix™, or Hulu™), which comprises one or more modules or applications and which may be embodied as hardware, software, firmware, or any combination thereof. The application server 116 is, in turn, shown to be coupled to the database server 118 that facilitates access to one or more information storage repositories or databases, such as the database 125.

The streaming content platform 180 provides a number of streaming or content viewing functions and services to users that interface with the network-based system 160. For example, the streaming content platform 180 provides information about media products including streaming or downloadable movies, TV series, and other content for sale or rent offered by the streaming content platform 180 and displayable on the user devices 130 and 140. In some embodiments, the streaming content platform 180 provides listings which contain information for media products. The listings for media products can be stored in the database 125 and may be searchable through the network-based system 160. The listings may include information indicative of a media product, a content or type of the media product, terms of sale or rent of the media product, shipping or viewing information, a description of the media product, a quantity, a geographic restriction of the media product, metadata associated with the media product, metadata associated with coding for the listing, and information indicative of media product organization, such as titles, categories, category taxonomies, and media product interrelations. The streaming content platform 180 can also facilitate the purchase or rental of physical media products in an online marketplace that can later be delivered to buyers via shipping or any conventional method.

While the streaming content platform 180 is shown in FIG. 1 to form a part of the network-based system 160, it will be appreciated that, in some embodiments, the streaming content platform 180 may form part of a payment service that is separate and distinct from the network-based system 160. Alternatively, the streaming content platform 180 may form part of a payment service that is a part of the network-based system 160. Further, while the client-server-based network environment 100 shown in FIG. 1 employs a user-server architecture, the present disclosure is not limited to such architecture, and may equally well find application in a distributed architecture system (e.g., peer-to-peer), for example. The streaming content platform 180 may also be implemented as standalone software programs, which do not necessarily have network capabilities.

The database server 118 is coupled to the database 125 and provides access to the database 125 for the user devices 130 and 140 and other components of the content review application server 110. The database 125 can be a storage device that stores information related to media products, media documents, web sites, and metadata relating to media products, media documents, or websites, and the like.

Also shown in FIG. 1 are users 132 and 142. One or both of the users 132 and 142 can be a human user (e.g., a human being), a machine user (e.g., a computer configured by a software program to interact with the user device 130), or any suitable combination thereof (e.g., a human assisted by a machine or a machine supervised by a human). One of the users may be a "power" user, as described more fully below. The user 132 is not part of the network environment 100, but is associated with the user device 130 and is a user of the user device 130. For example, the user device 130 can be a desktop computer, a vehicle computer, a tablet computer, a navigational device, a portable media device, a smartphone, or a wearable device (e.g., a smart watch or smart glasses) belonging to the user 132. Likewise, the user 142 is not part of the network environment 100, but is associated with the user device 140. As an example, the user device 140 can be a desktop computer, a vehicle computer, a tablet computer, a navigational device, a portable media device, a smartphone, or a wearable device (e.g., a smart watch or smart glasses) belonging to the user 142. Although described as outside of the network environment 100, the network environment can be understood to include data representing an aggregation of user behaviors communicated through user devices associated with the users.

The user device 130 contains a web client 134 which may access the streaming content platform 180 and, in some cases, the content review application server 110, via the web interface supported by the web server 114. Similarly, a programmatic client 136 is configured to access the various services and functions provided by the streaming content platform 180 and, in some cases, the content review application server 110, via the programmatic interface provided by the API server 112. The programmatic client 136 may, for example, perform batch-mode communications between the programmatic client 136, the network-based system 160, and the content review application server 110. Although the user device 130 is shown with the web client 134 and the user device 140 is shown with the programmatic client 136, it should be understood that both the user device 130 and the user device 140 may each include instances of the web client 134 and the programmatic client 136 specific to the user device 130 or 140 containing the client.

Any of the machines, databases, or devices shown in FIG. 1 may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 150 may be any network that enables communication between or among machines, databases, and devices (e.g., the content review application server 110 and the user device 130). Accordingly, the network 150 can be a wired network, a wireless network (e.g., a mobile or cellular network), or any suitable combination thereof. The network 150 can include one or more portions that constitute a private network, a public network (e.g., the Internet), or any suitable combination thereof. Accordingly, the network 150 can include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 150 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
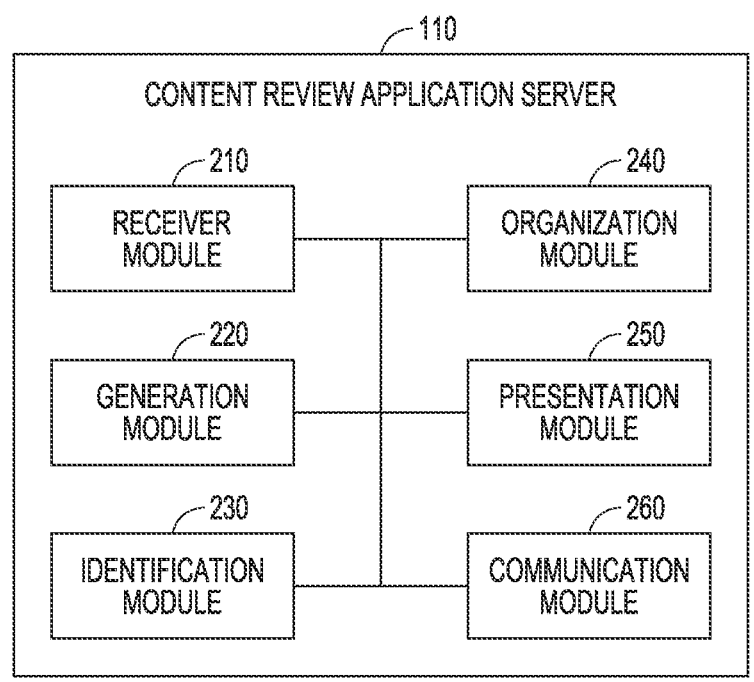
FIG. 2 is a block diagram illustrating components of a content review application server, according to some example embodiments.

FIG. 2 is a block diagram illustrating components of the content review application server 110, according to some example embodiments. The content review application server 110 is shown as including a receiver module 210, a generation module 220, an identification module 230, an organization module 240, a presentation module 250, and a communication module 260, all configured to communicate with each other (e.g., via a bus, shared memory, or a switch). Any one or more of the modules described herein may be implemented using hardware (e.g., one or more processors of a machine) or a combination of hardware and software. For example, any module described herein may configure at least one processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The receiver module 210 receives sets of user interactions from a plurality of users (e.g., the user 132 of FIG. 1, the user 142 of FIG. 1, and other users). The sets of user interactions may be performed on a set of data objects, such as media products. The sets of user interactions may include data relating to interactions between the users 132 and 142 themselves, and/or data relating to interactions between the user 132 or 142 and the streaming content platform 180 of FIG. 1, and/or a combination of such interactions. The sets of user interactions are received by the content review application server 110 via the receiver module 210. The sets of user interactions can include or comprise data representative of selections of the user 132 or 142 with respect to the data published by the publication system 120 of FIG. 1, or media products selected, browsed, accessed, or viewed (in whole or in part) by the users 132 or 142. The data representative of the interactions can include one or more selections or interruptions caused by the user 132 or 142 interacting with a touch screen of the user device 130 or 140 of FIG. 1, a mouse, a keyboard, or other input device capable of enabling user interaction with a user interface of the user device 130 or 140. The receiver module 210 can receive the one or more selections via communication between the user device 130 or 140 and the communication module 260.

The generation module 220 generates a set of associations between data objects of the set of data objects. Each association may be identified among two or more data objects (e.g., between a first data object and a second data object) of the set of data objects. The associations may be indicative of user interactions performed on each of the two or more data objects. For example, the generation module 220 can generate a first set of associations among a first set of data objects and generate a second set of associations among or between the second set of data objects. Further, the generation module 220 can generate a third set of associations between the first set of data objects and the second set of data objects. One or more of the associations in the set of associations may be based on input received from either or both of the users 132 and 142.

The generation module 220 can comprise a hardware module, described below in more detail. By way of example, in some embodiments, the generation module 220 can comprise a hardware processor configured to perform the operations relating to the generation of sets of associations among data objects of the set of data objects. The operations for generating the associations among the data objects are described below in more detail. The generation module 220 can generate curated recommendations based on a set of associations generated by the receiver module 210. One or more of the recommendations may be based on input received from either one or both of the users 132 and 142.

The identification module 230 identifies a set of data object clusters indicative of associations of the set of associations among or between data objects of the set of data objects. The identification module 230 can perform graph clustering to identify data object clusters. The data object clusters can be indicative of associations of the set of associations among the data objects.

The organization module 240 can generate an organization for the set of data objects based on the set of associations and the set of data object clusters. The organization module 240 can organize the set of data objects in a logical organization (e.g., on a database) or other non-transitory machine-readable storage medium. The organization module 240 can perform operations of weighting, ranking, and other organizational operations on the set of data objects, as explained in more detail below.

The presentation module 250 causes presentation of a plurality of data objects of the set of data objects based on the organization. The presentation module 250 can cause the presentation of a plurality of data objects by transmitting the plurality of data objects and instructions indicative of the organization to the user device 130 or 140. The instructions can cause formatting of the plurality of data objects on the user interface of the user device 130 or 140 according to one or more visualization techniques to present the set of data objects based on the organization. The presentation module 250 can cause the set of data objects to be presented via display on a screen (e.g., in a graphically based representation, a text-based representation, or a combination thereof), via sound transmission (e.g., via voice or simulated voice transmission), or any other suitable method for presentation. Where the presentation module 250 presents the set of data objects on the screen of the user device 130 or 140, the presentation module 250 can cause the user device 130 or 140 to display the set of data objects as a set of representative icons or images, where each icon is representative of a data object of the set of data objects. The icons or images can be presented in a list view, a grid view, or any other suitable arrangement of icons or images.

The communication module 260 enables communication for the content review application server 110. For example, the communication module 260 can enable communication among the receiver module 210, the generation module 220, the identification module 230, the organization module 240, and the presentation module 250. In some embodiments, the communication module 260 can enable communication among the content review application server 110, the user device 130 or 140, and the publication system 120, as well as other systems capable of communicating with the content review application server 110, such as via a communications network (e.g., the internet).

Figure 3:
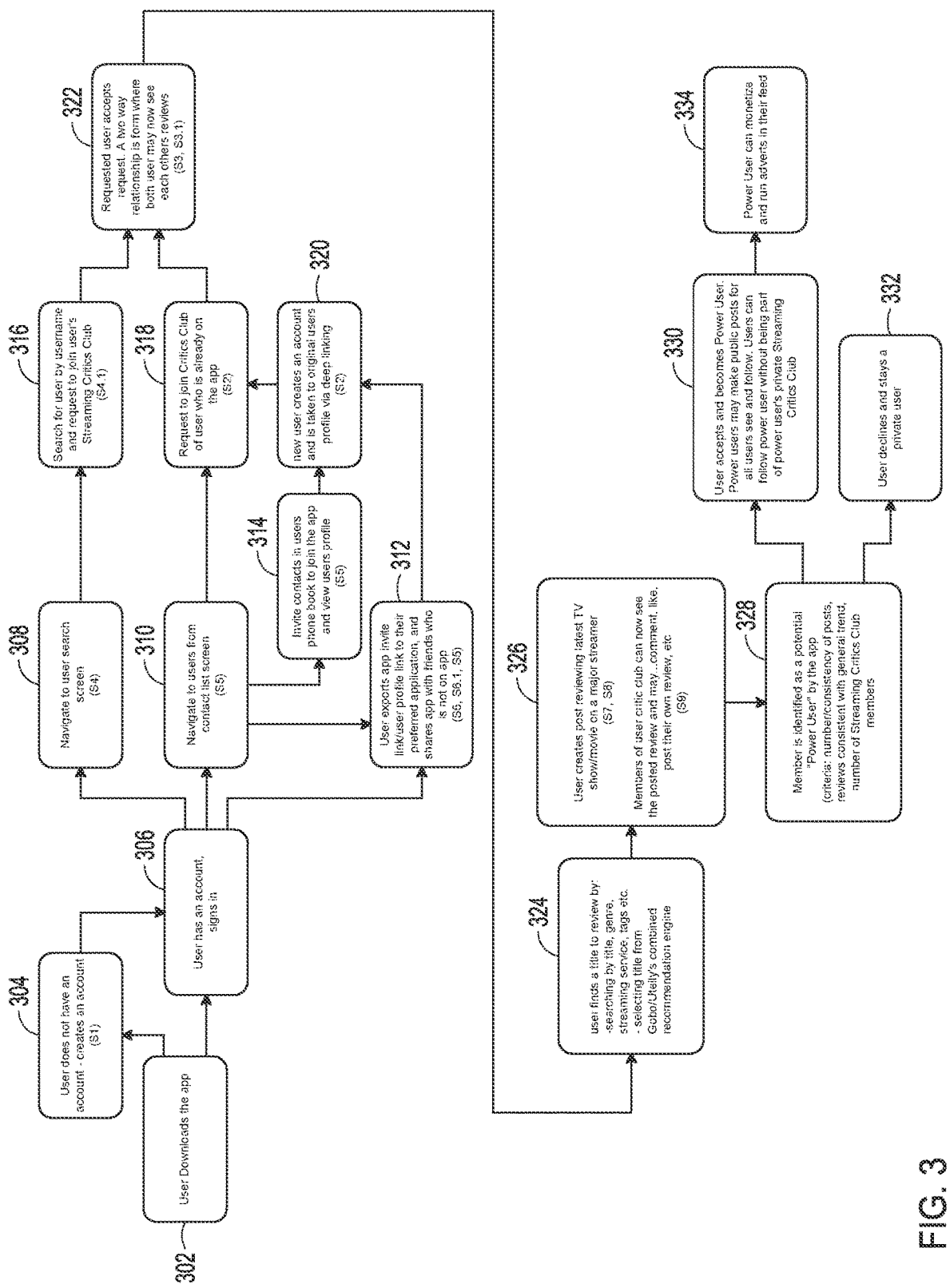
FIG. 3 is a flowchart illustrating operations of a system in performing a method, according to some example embodiments.

FIG. 3 is a flowchart illustrating operations of the content review application server 110 in performing a method 300 of sharing content including generating a set of recommendations of a set of data objects based on user interactions of a plurality of users, according to some example embodiments. Operations in the method 300 may be performed by the content review application server 110, using modules described above with respect to FIG. 2. In the description of the example operations below, various ones of the operations may be performed in the alternative to other operations, or may be performed sequentially, or may be performed in a different order to the order described below as an example only.

In operation 302, a user such as the user 132 of FIG. 1 (or the user 142 of FIG. 1) downloads an instance of the content review application from the content review application server 110 to the respective user device 130 of FIG. 1 or user device 140 of FIG. 1.

Figure 4:
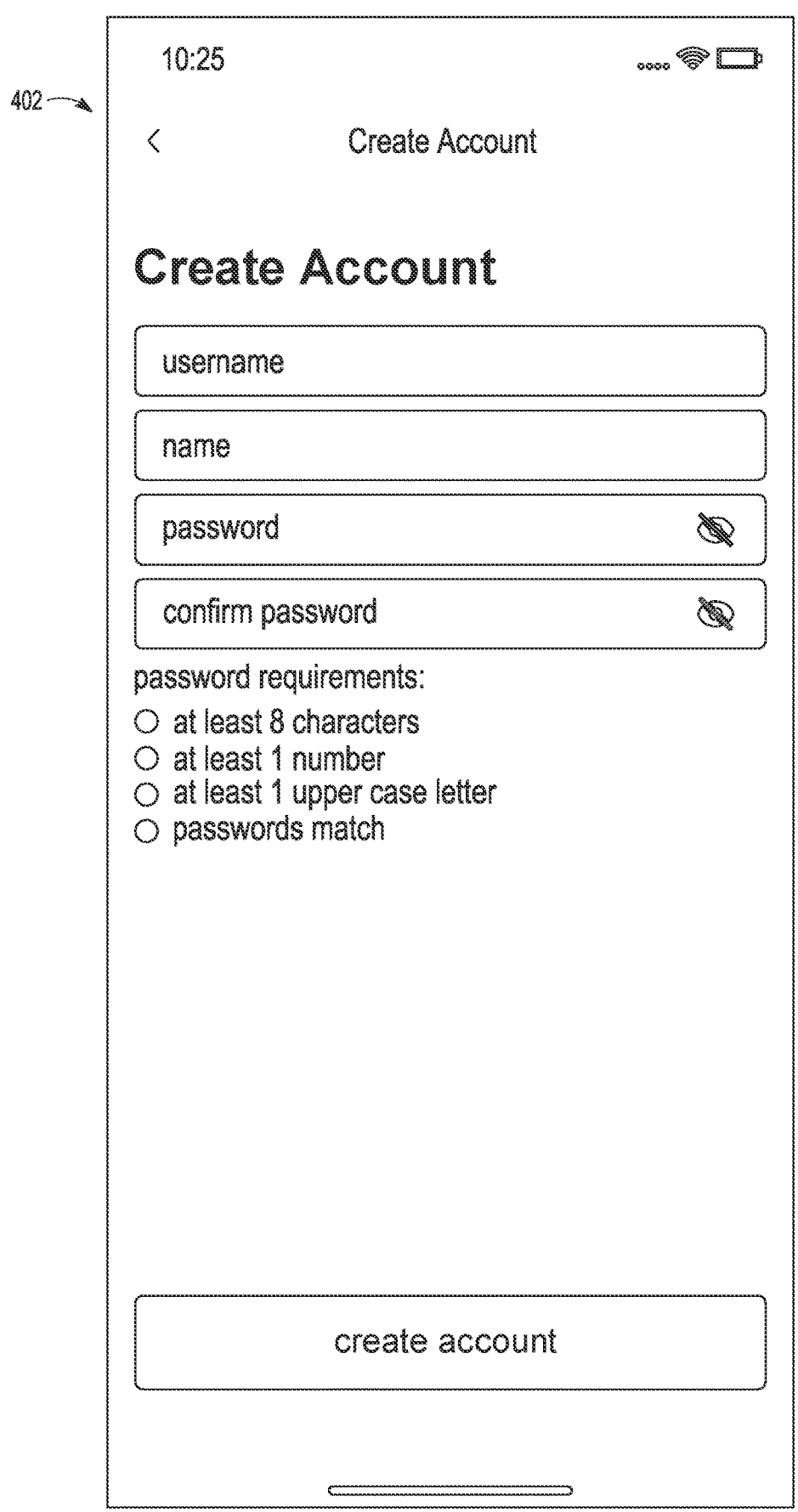
FIGS. 4-15 are example screen displays in a method, according to some example embodiments.

In operation 304, if the user 132/142 does not have an application account, an application account is created for them at the content review application server 110 and stored in a database. In some examples, a user account may be created and stored at the publication system 120 of FIG. 1 in the database 125 of FIG. 1. In order to receive user input in opening an account, a screen display (S1) shown for example at 402 in FIG. 4 may be displayed by the content review application server 110 on a user interface of the user device 130/140 of FIG. 1. User input is received from the user 132/142.

In operation 306, if the user 132/142 already has a content review application account, the user 132/142 signs into the content review application.

Figure 8:
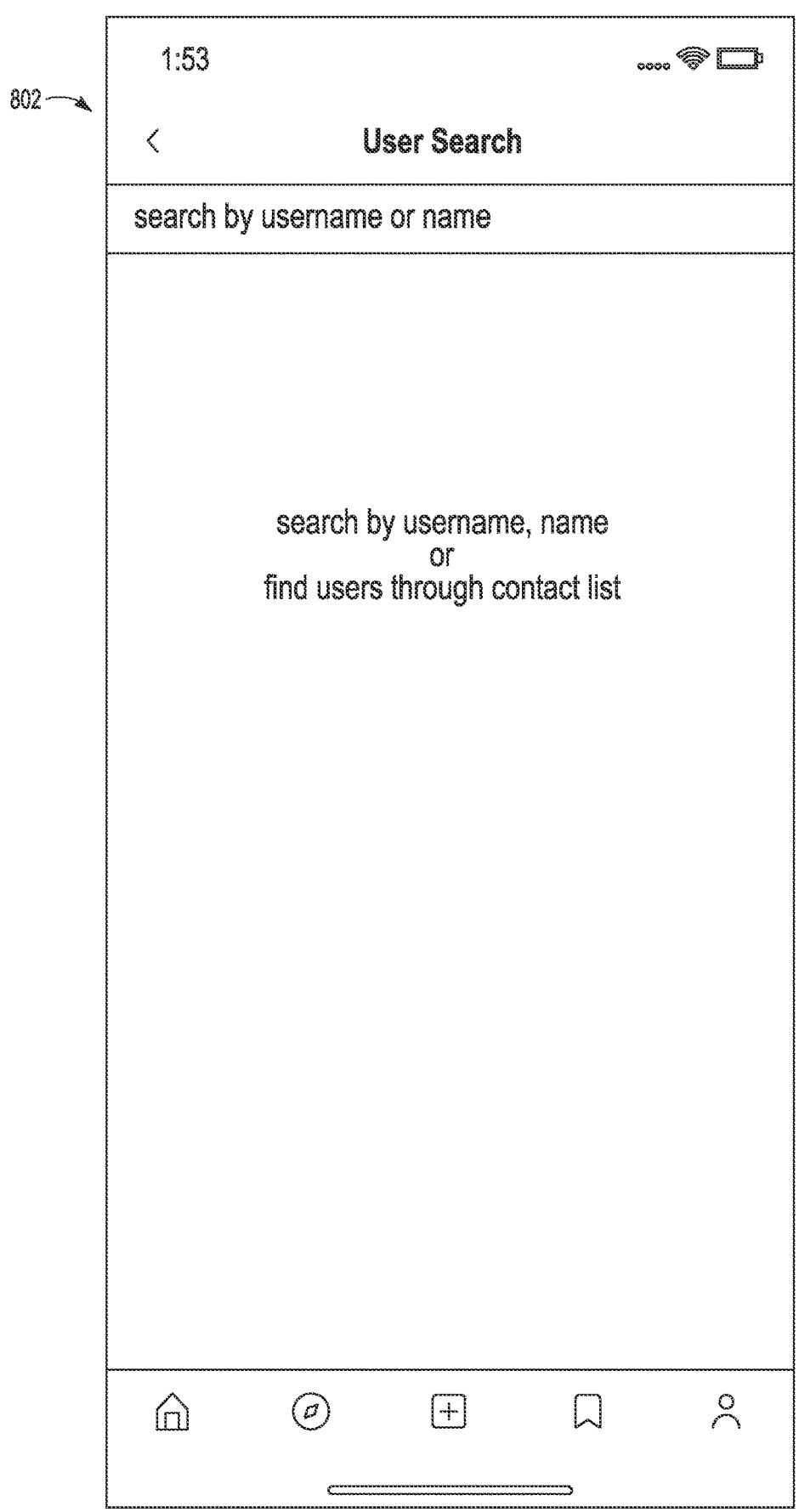

In operation 308, the user 132/142 can navigate to a search screen, for example provided in a screen display (S4) shown for example at 802 in FIG. 8 presented by the content review application server 110 in the user interface of the user device 130/140.

Figure 10:
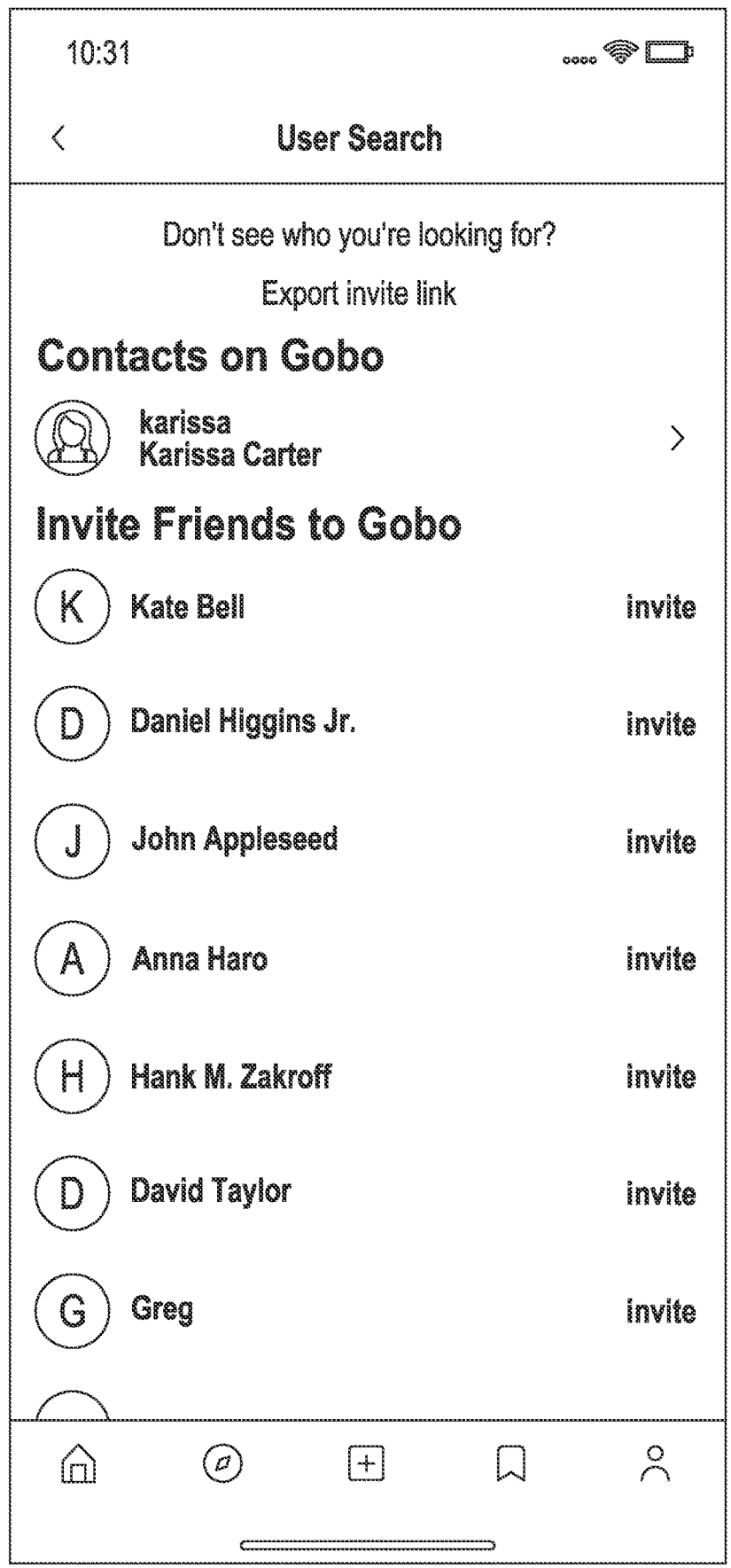

In operation 310, the user 132/142 can navigate to a search screen, for example, provided in a screen display (S5)

shown for example at 1002 in FIG. 10 presented by the content review application server in the user interface of the user device 130/140.

Figure 11:
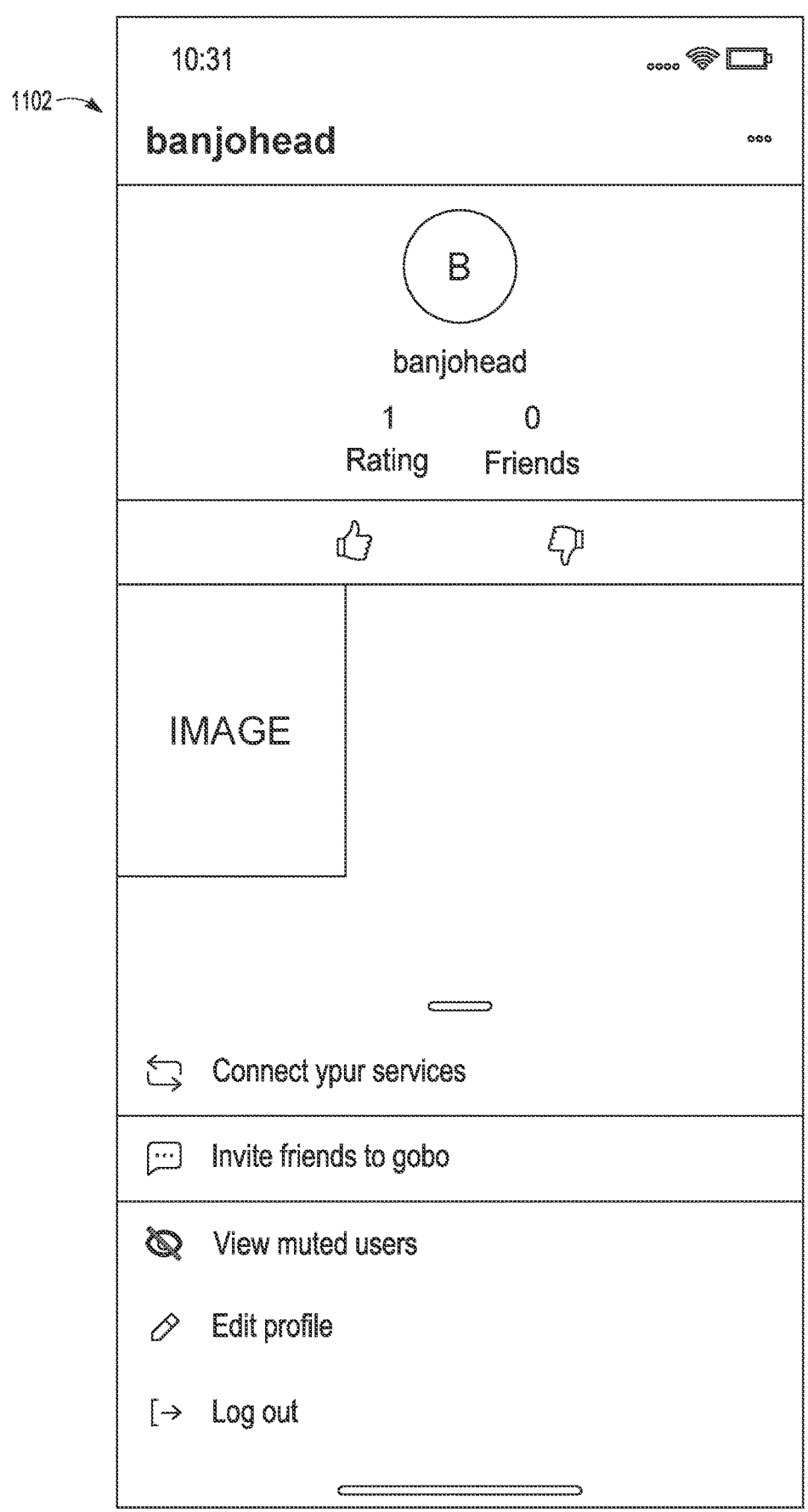
Figure 12:
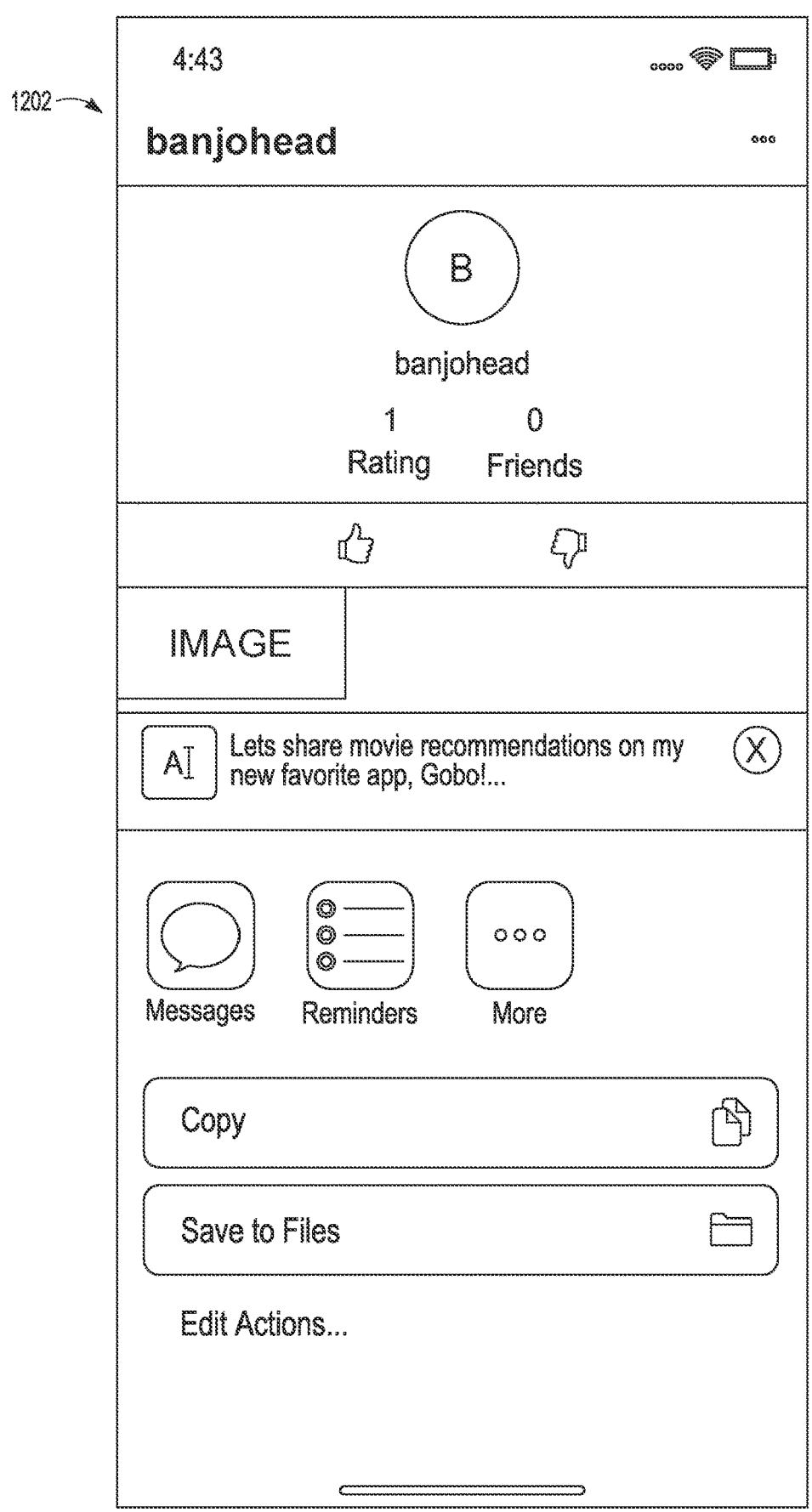

In operation 312, the user 132/142 can export a content review application invitation link, or a user profile link associated with another application (for example, a digital movie or content streaming application), and share an invitation to join the content review application (or other application) with a friend who does not yet participate in the content review application. To this end, example screen displays such as (S6), (S6.1), and (S5) shown respectively at 1102 of FIG. 11, 1202 of FIG. 12, and at 1002 in FIG. may be presented by the content review application server 110 in the user interface of the user device 130/140.

In operation 314, the user 132/142 can invite contacts in the user's phone book (e.g., a native or cloud-based "Contacts" memory or database) to join the content review application and view the user's profile. A screen display (S5) shown for example at 1002 in FIG. 10 may be presented by the content review application server 110 in the user interface of the user device 130/140 as part of this operation.

Figure 9:
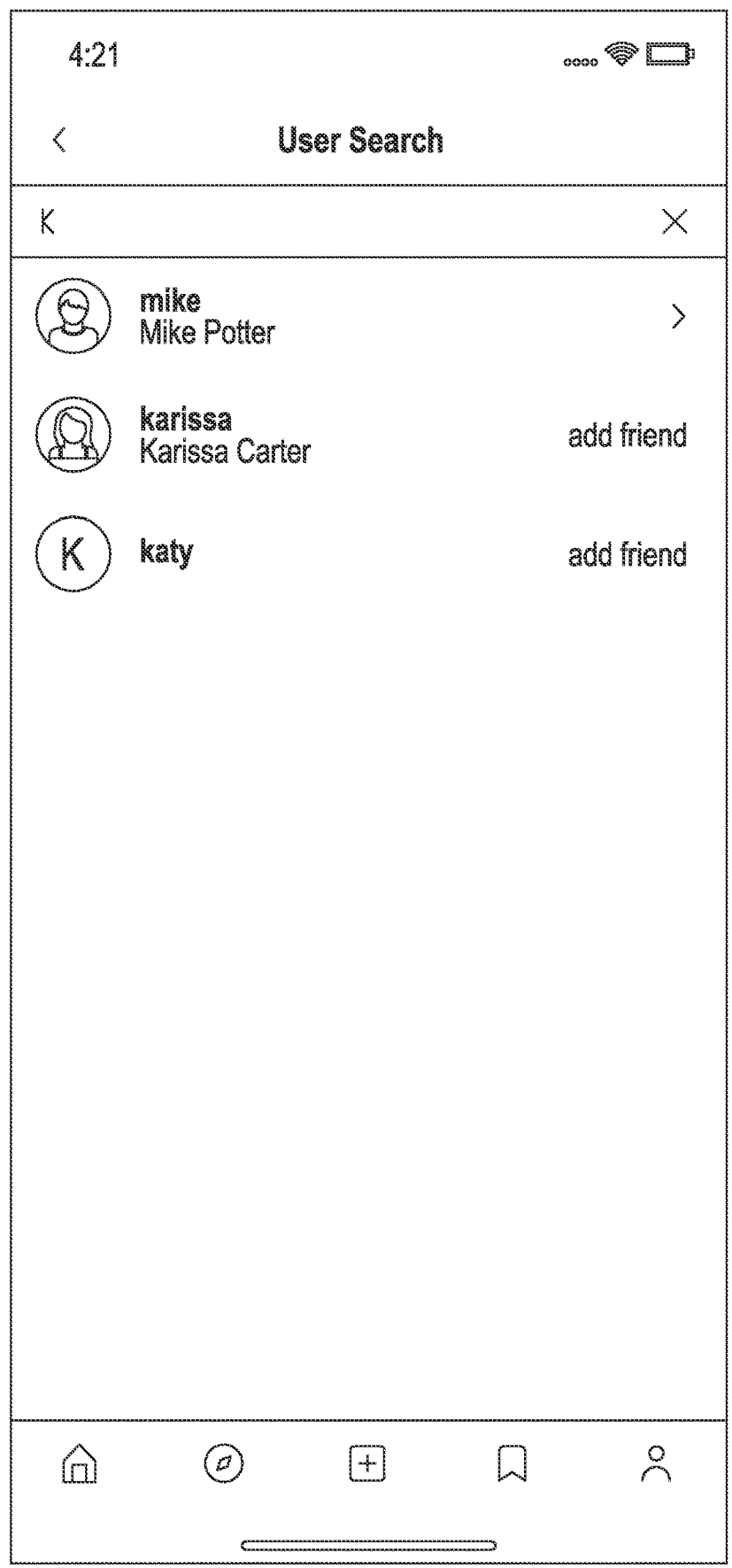

In operation 316, the user 132 can search for another user (for example the user 142) by username and request the other user 142 to join a movie review group, for example called a streaming "Critics Club". A screen display (S4.1) for example as shown at 902 in FIG. 9 may be presented by the content review application server 110 in the user interface of the user device 130 of the user 132 as part of this operation.

Figure 5:
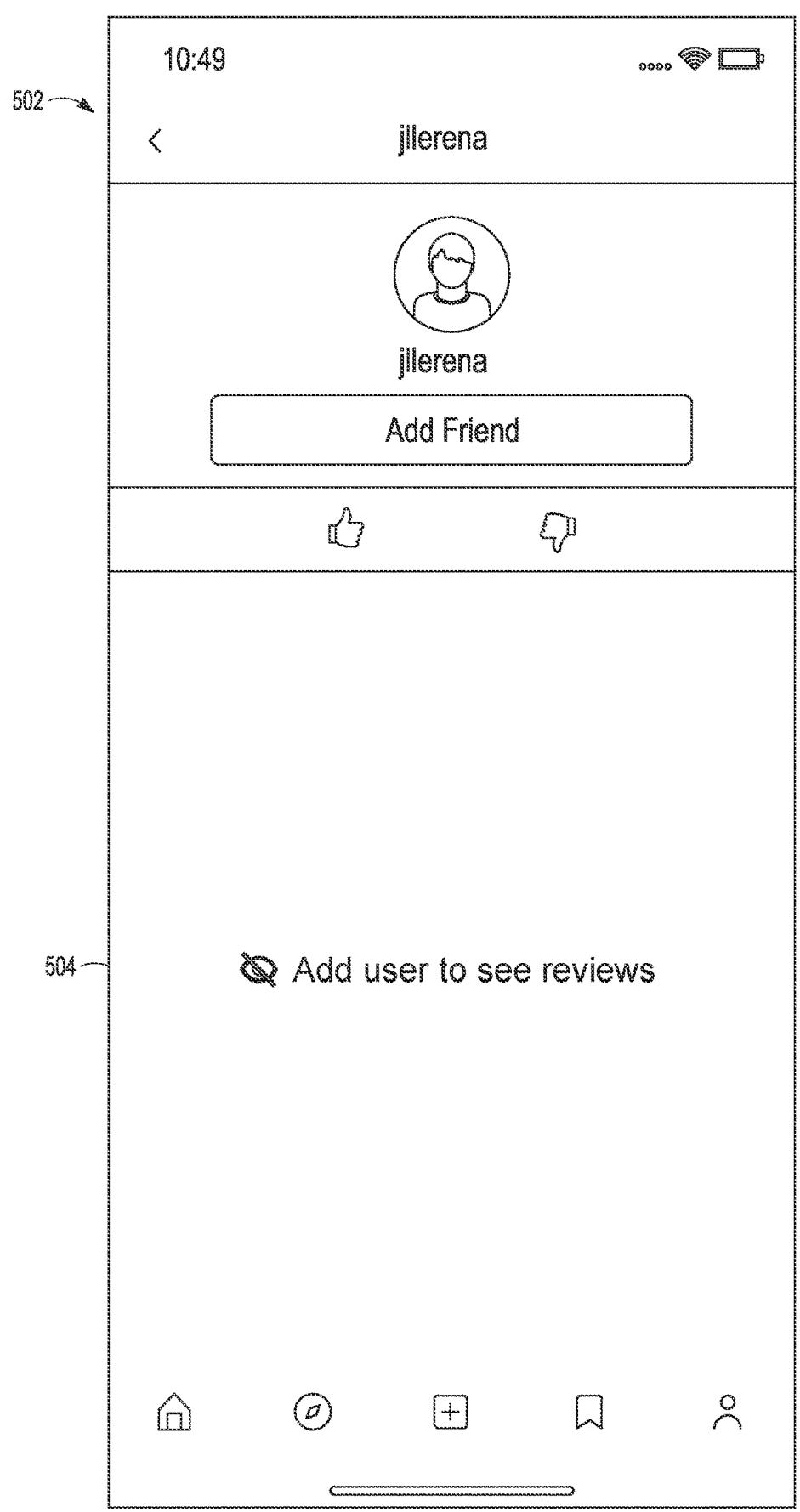

In operation 318, the user 132 can issue an invitation to another user (for example the user 142) already on the content review application (i.e. has an existing application user account) and request the other user 142 to join the streaming content review group (e.g., the Critics Club). A screen display (e.g., S2, as shown at 502 in FIG. 5) may be presented by the content review application server 110 in the user interface of the user device 130 of the user 132 as part of this operation.

In operation 320, a new user, for example the user 142 having been invited by the user 132, creates a content review application account at the content review application server 110 and, in some examples, is directed to a user profile of the inviting user 132. This direction may occur via deep linking. In some examples, a screen display (e.g., S2, as shown at 502 in FIG. 5) may be presented by the content review application server 110 in the user interface of the user device 130 of the inviting user 132, or in the user interface of the user device 140 of the invited user 142, as part of this operation.

Figure 6:
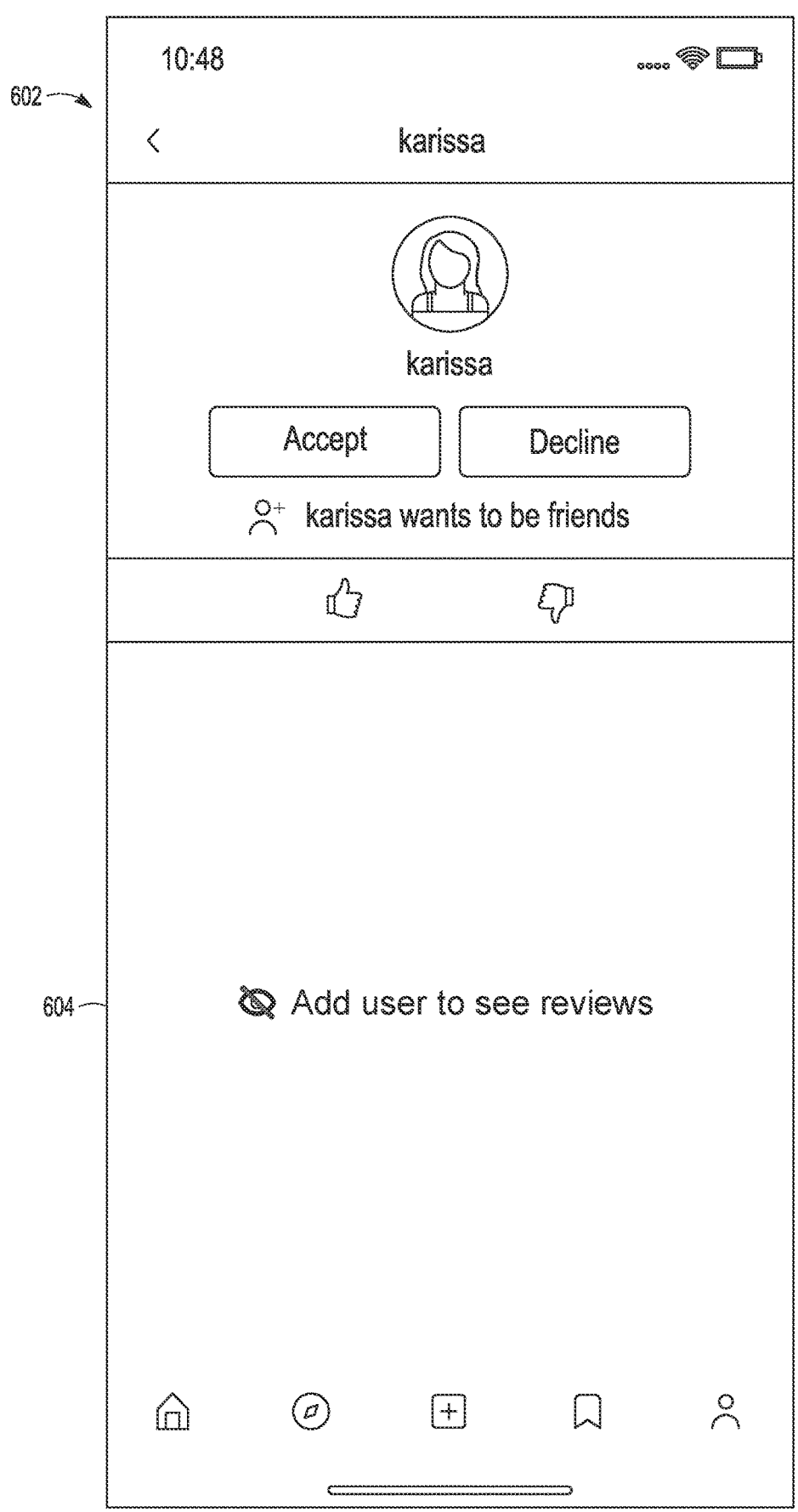
Figure 7:
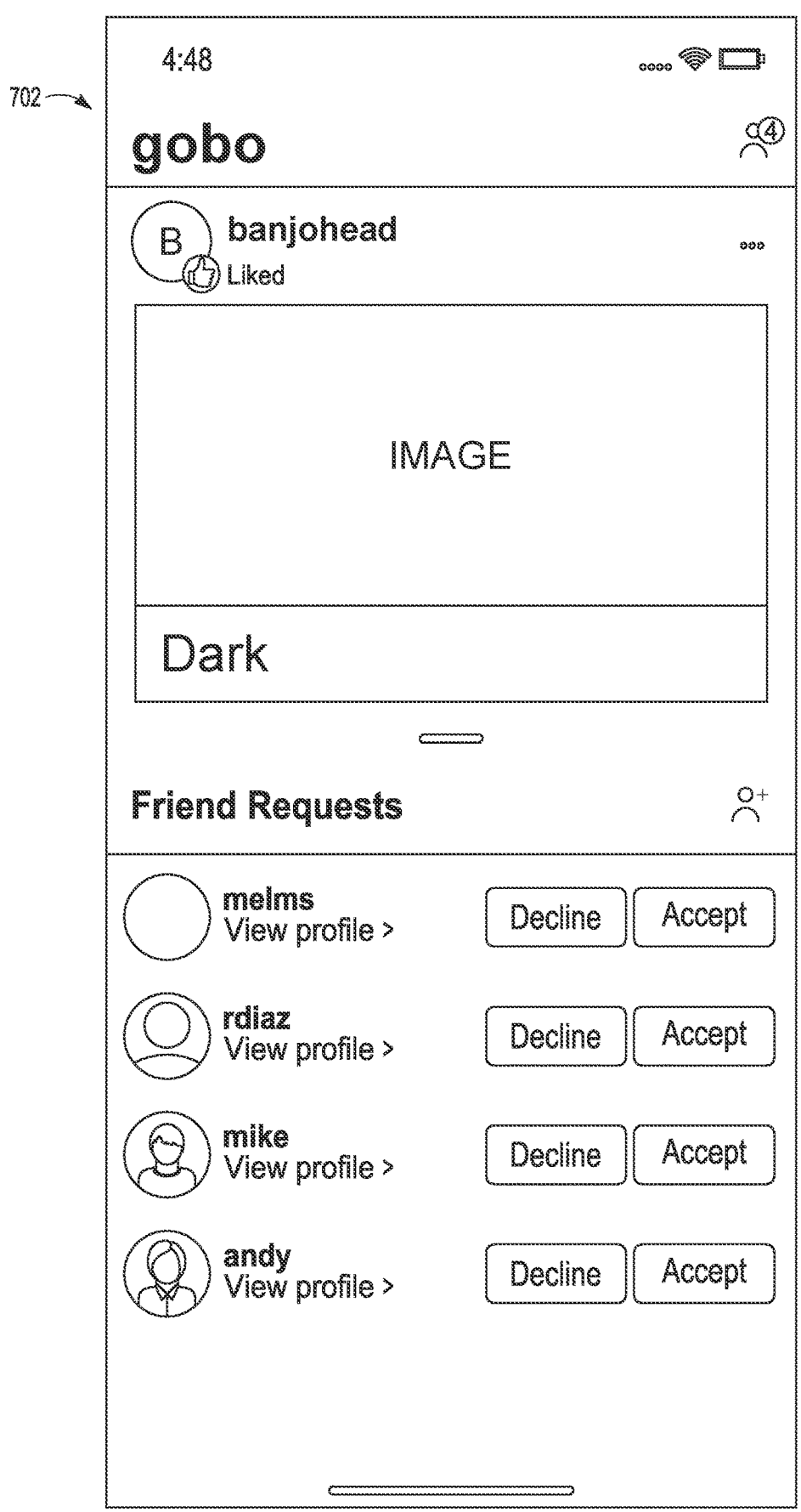

In operation 322, the invited user 142 accepts the request to join the streaming content review group (Critics Club). A two-way relationship is formed in which both the inviting user 132 and the invited user 142 can now see each other's posted reviews (i.e., previously generated or received recommendations as discussed herein, and posted via the recommendations application). In some examples, the two-way relationship and reciprocal visibility enjoyed by one user (for example the inviting user 132) is limited only to recommendations generated or received by the other user (for example the invited user 142). The nucleus of a private streaming content review group (the Critics Club) is thus formed. To the extent that the inviting user 132 and the invited user 142 already from part of other streaming content review groups formed using the content review application server 110, visibility into these groups or their member recommendations is not permitted, at least initially. Screen displays (e.g., S3 and S3.1, as shown at 602 in FIG. 6 and at 702 in FIG. 7), may be displayed on the user interface of the user device 140 by the content review application server 110 of the invited user 142 as part of this operation. If the inviting user 132, or invited user 142, wishes to expand the nucleus of the newly formed group, an "add user to see reviews" function may be invoked, for example, as shown selectable by an interactive user element 504 in screen display (S2) of FIG. 5, or by an interactive user element 604 in screen display (S3) of FIG. 5.

In operation 324, the inviting user 132 and the invited user 142, now in the same streaming content review group (as well as any other users "added" to the group), can find titles of streaming movies to review by using the content review application to search by title, genre, streaming service, tags and/or other criteria; or, to select a title to review from a third-party recommendation engine.

Figure 13:
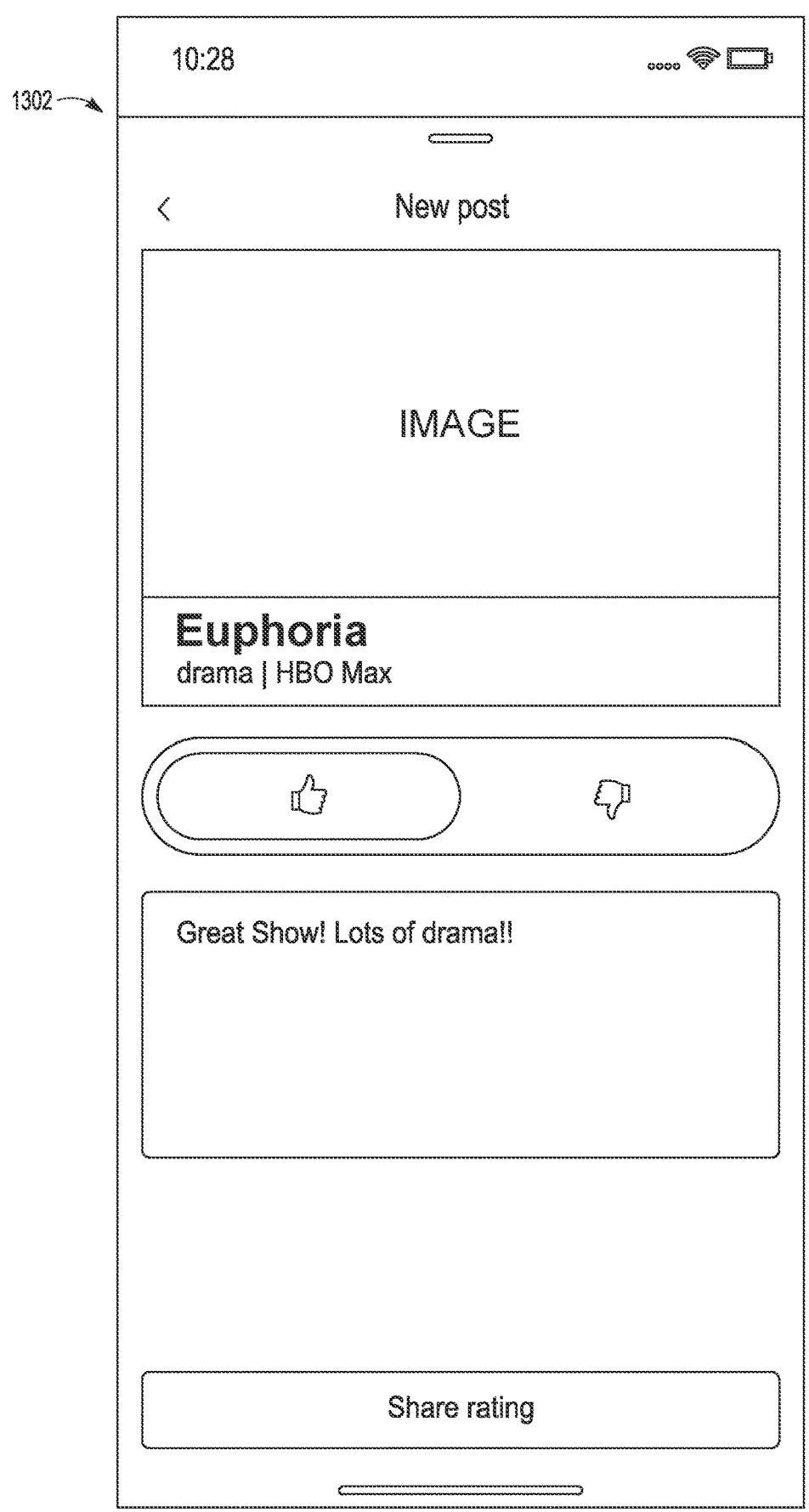
Figure 14:
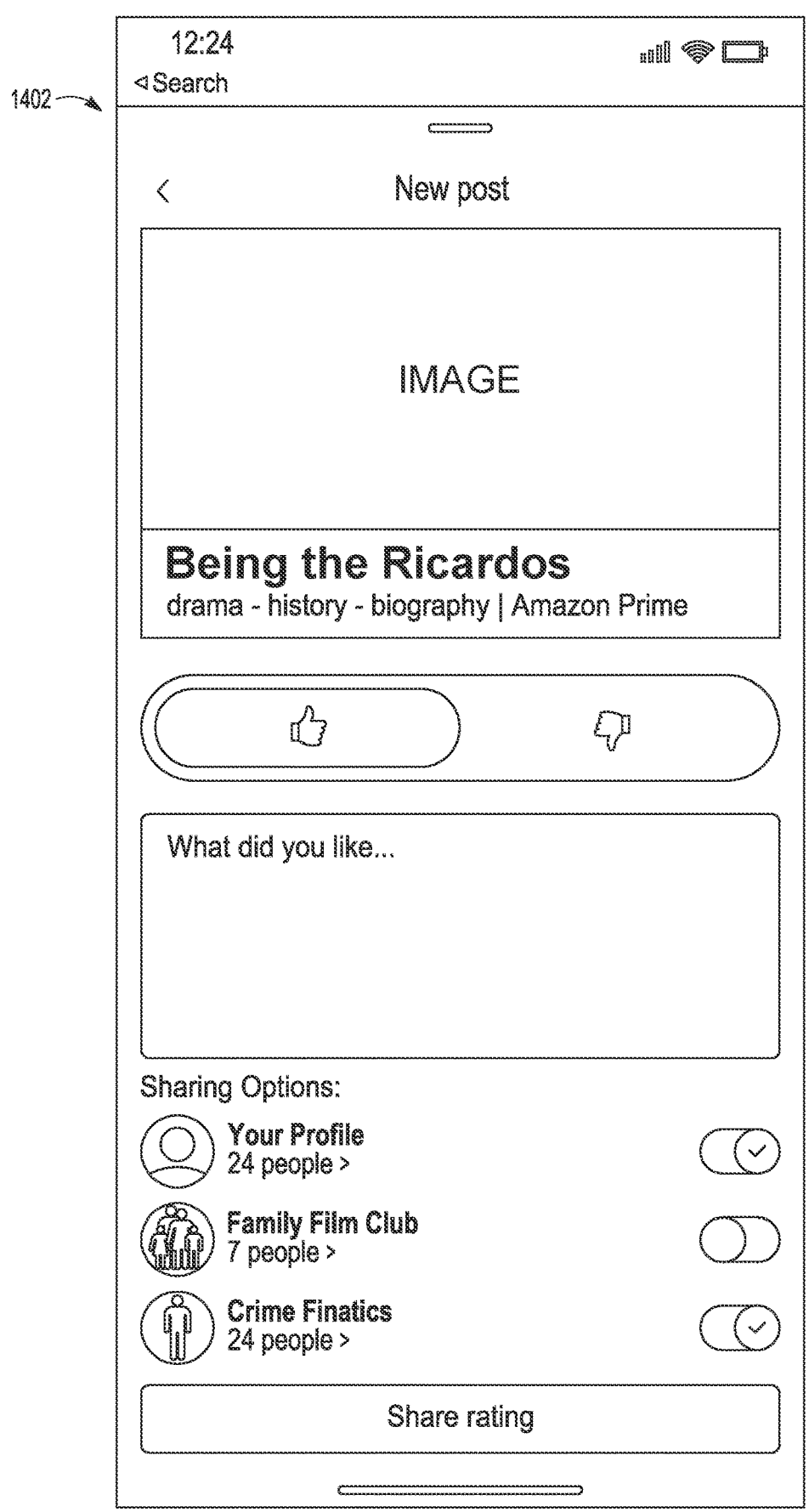
Figure 15:
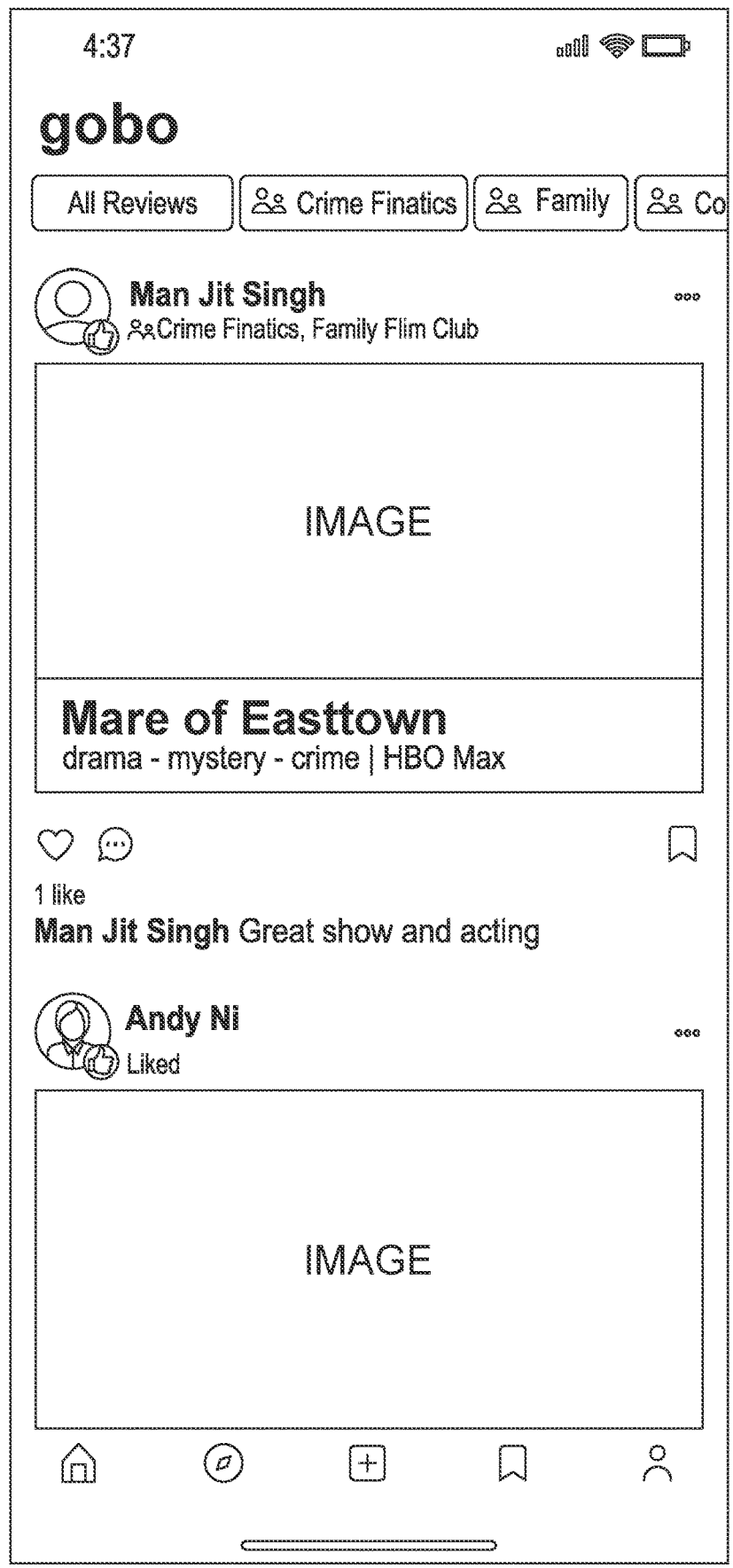

In operation 326, the user 132/142 and any added user now in the streaming content review group can create posts reviewing streamed digital content such as movies and TV shows. The posts may include user generated recommendations or machine-generated recommendations as described herein, or combinations of both such recommendations. In some examples, screen displays (S7) and (S8) for example as shown at 1302 in FIGS. 13 and 1402 in FIG. 14, may be presented by the content review application server 110 in the user interface of the user device 130 of the inviting user 132, and/or in the user interface of the user device 140 of the invited user 142, and/or in the user interface of a user device of an added user, as part of this operation. Members of the streaming content review group can see the posted reviews and may comment, like, or post their own reviews, and so forth. In some examples, a screen display (e.g., S9, as shown at 1502 in FIG. 15), may be presented by the content review application server 110 in the user interface of the user device 130 of the inviting user 132, and/or in the user interface of the user device 140 of the invited user 142, and/or in the user interface of a user device of an added user, as part of this operation.

In operation 328, a user 132/142 (or added user) can be identified by the content review application server 110 as a "power" user based on one or more criteria such as a number or consistency of posts, a type or nature of review, a consistency of review with general trends, or a number of streaming content movie club members. The identified user may be invited to become a power user by the content review application server 110.

In operation 330, an identified power user 132/142 (or added user) accepts the nomination and becomes a power user. Power users may make public posts for all users or the content review application to see, regardless of their membership to one or more streaming content review groups. A power user may be followed by other users. A user 132/142 or added user can follow a power user without being part of any streaming content review group that the power user may have formed or be a part of.

In operation 332, an identified power user can decline an invitation to become a power user. The content review application server 110 stores the declined invitation, accordingly.

In operation 334, the content review application server enables a power sure to monetize their reviews and post advertisements in their content review application feed.

In some embodiments, a set of recommendations presented to a user 132 or 142 is based on a set of user interactions performed on a set of data objects, such as the media products and data or metadata associated with the media products. For example, in the publication system 120, the user interactions can be indicative of a history of users searching, browsing, buying, or otherwise interacting with media products offered by the streaming content platform 180 of the publication system 120, or data or metadata indicative of or associated with the media products. The data or metadata indicative of or associated with the media products may include the names or bibliographic information of an actor, an artist, a screen writer, a producer, a director, and/or and other person or content (for example, a production country) associated with a media product. The publication system 120 may store the user interactions in the database 125 or any other suitable non-transitory machine-readable storage medium. In some embodiments, the user interactions may be communicated to the content review application server 110 by the publication system 120, where the user interactions are stored in or in conjunction with the publication system 120.

In some embodiments, the content review application server 110 may receive user interactions from users, such as the user 132 and the user 142, and/or interactions of the users 132 and 142 with media products offered by the streaming content platform 180 of the publication system 120, or data indicative of the media products. In these embodiments, data indicative of the user interactions of the users 132 and 142 may be transmitted through the content review application server 110 such that the content review application server 110 receives the user interactions prior to passing those interactions to an intended recipient. For example, the content review application server 110 may initially receive one or more packets of data over the network 150, indicative of user interactions of the users 132 and 142. The content review application server 110 can copy, log, or otherwise make records of the user interactions, and then transmit the user interactions to the intended recipient, such as the publication system 120. In some embodiments, the content review application server 110 can receive a copy of the data indicative of the user interactions, for example, by receiving a copy of the packet sent to an intended recipient of the user interactions. In some embodiments, the content review application server 110 may receive data indicative of the user interaction without receiving the user interaction. For example, the content review application server 110 may receive a portion of a data packet or some other data indicative of the content of the user interaction, without receiving the complete transmission associated with the user interaction.

Further, in some embodiments, the content review application server 110 may be implemented as a portion of the publication system 120. In these embodiments, the user interactions received by the content review application server 110 may be received through the communication module 260, the API server 112, or the application server 116.

In some embodiments, the data object is represented or implemented as a data object file or a data object entry in a database. For example, the data object file or the data object entry may be stored on the database 125 of the publication system 120. The data object file or data object entry may contain metadata or be associated with metadata existing in another file or entry on a database. Each association of the data object can be generated by modifying a portion of metadata included in the data object file or data object entry. Where the metadata is in another file or entry, the metadata of the file or entry may be similarly modified. In some embodiments, a metadata file or entry may be created based on the generation of the association of data objects, instantiating metadata for the data object file or data object entry or replacing a previous metadata file or metadata entry.

The associations can represent interactions between a user and a data object, such as a media product. The associations can include a type of interaction. For example, in conjunction with the streaming content platform 180, the type of interaction can include a viewing (for example, a streaming or a download of a media product), a purchase or rental of an online or physical media product, a browsing of a media product listing, a viewing on a media product or release date, a user rating, and other suitable types of interactions. In some embodiments, data indicative of the interactions can be stored in a transaction log that can be processed to generate a graph of the associations used in clustering operations, described in more detail below. These graphs can be expressed in a plurality of tables. Such tables include a source node index, a target node index, and a transaction table. The source node index can be indicative of the users performing interactions on the data objects. The target node index can be indicative of an item or category of an item, for example. The transaction table can be indicative of specific actions, such as bidding, buying, watching, or other suitable transactions or interaction types with references to both the source node index and the target node index associated with the individual transactions within the transaction table. The transaction table can be weighted (e.g., by tie strength) by the number of transactions between users and items.

In some embodiments, a metadata file, or metadata entry, can be an association file having a portion of metadata indicative of a relationship between the data object and the association file. The association file can also include data indicative of the associations between data objects, data object files, or data object entries. The association file can be stored on a first non-transitory machine-readable storage medium which also stores the data object files or data object entries or can be stored on a second non-transitory machine-readable storage medium. In these embodiments, the first and second non-transitory machine-readable storage media may be in communication, such as across the network 150. The first and second non-transitory machine-readable storage medium may additionally include lookup tables, a relational database, or other storage mechanism suitable to contain data relating to related data object files or data object entries of the first and second non-transitory machine-readable storage medium, for example. In embodiments where the metadata indicative of an association or the association file itself is modified, removed, or created, the lookup tables, relation database, or other storage mechanism may also be modified to reflect the change to the association between two data objects.

The portion of metadata in the metadata of the data object file or data object entry, the metadata file, or the metadata entry indicative of each association can include metadata indicative of a number of other data object files or data object entries associated with the data object file or data object entry. For example, the portion of metadata for a first data object can include an integer value indicative of a number of other data objects associated with the first data object. For instance, if the first data object has six associations distributed among three other data objects, the portion of metadata indicating the number of data objects associated with the first data object may be an integer value of three, indicating the three other data objects.

In some embodiments, the metadata can include a number of associations between the data object file or data object entry, and each of the other data object files or data object entries with which the data object file or data object entry is associated. For example, in the instance above where the first data object is associated with three other data objects (e.g., a second data object, a third data object, and a fourth data object), the metadata including the number of associations for the first data object can include identification values indicative of an identification for each of the second data objects, the third data objects, and the fourth data objects. The metadata can also include an association value corresponding to each identification value. The association value may indicate a number of associations between the first data object and data object of the corresponding identification value. For example, where the two users have interacted with both the first data object and the second data object, the content review application server 110 may determine two associations between the first data object and the second data object. In this example, the association value may be two, for the identification value of the second data object, in the metadata of the first object. In some embodiments, the metadata can include a total number of associations corresponding to the data object file or data object entry. In the example above, the metadata includes a total number of six for indicating the total number of associations between the first data object and the three other data objects.

In some examples, the content review application server 110 generates an organization for the set of data objects. In some embodiments, the organization is based on the set of associations and the set of data object clusters. For example, the organization can be generated such that data objects having direct associations are linked closely together with other data objects in a given cluster. The organization can also retain a link between data objects more tangentially related, given their respective positions on the graph. The organization of the set of data objects can be both a logical organization on a database or other non-transitory machine-readable storage medium. In some embodiments, the organization can include weighting and ranking the data objects. Although described with reference to associating, weighting, and ranking of data objects, it will be understood by one skilled in the art that the organization may include or be based on any suitable method for organizing data objects within the set of data object clusters.

In some embodiments the organization can be a graphical or user readable organization generated for a graphical user interface. For example, the content review application server 110 may group representations of data objects in a graphical display, indicative of the associations between the data objects and representative of data object clusters. In some embodiments, the content review application server 110 can also distribute data objects found in a data object cluster across a graphical user interface to avoid granting additional weight to a data object cluster within the graphical representation of the organization. In some embodiments, the organization module 240 of the content review application server 110 configures at least one processor of the content review application server 110 to generate the organization for the set of data objects.

In some examples, the content review application server 110 causes presentation of a plurality of data objects of the set of data objects on a user interface of the user device 130, based on the organization. The plurality of data objects can include a set of recommendations presented to the user 132 based on the set of associations, the set of data object clusters, and a user input (e.g., a query). In some embodiments, the presentation module 250 configures at least one processor of the content review application server 110 to cause the presentation of the plurality of data objects in a user interface of the user device 130 or 140. In some embodiments, the presentation module 250 receives the plurality of data objects directly from the organization module 240. Alternatively, the presentation module 250 receives the plurality of data objects from the organization module 240 via the communication module 260.

The presentation module 250 can cause the presentation or display of the plurality of data objects or set of recommendations on a user interface (e.g., display or other output device) of the user device 130. In some embodiments, the presentation module 250 transmits the plurality of data objects and instructions indicative of the organization by which to display the plurality of data objects in order to present the plurality of data objects for display. For example, the presentation module 250 passes the plurality of data objects and the instructions indicative of the organization to the communication module 260 which then transmits the plurality of data objects and the instructions indicative of the organization to the user device 130. The instructions can be processor executable instructions that cause the user device 130 to display the plurality of data objects.

Figure 16:
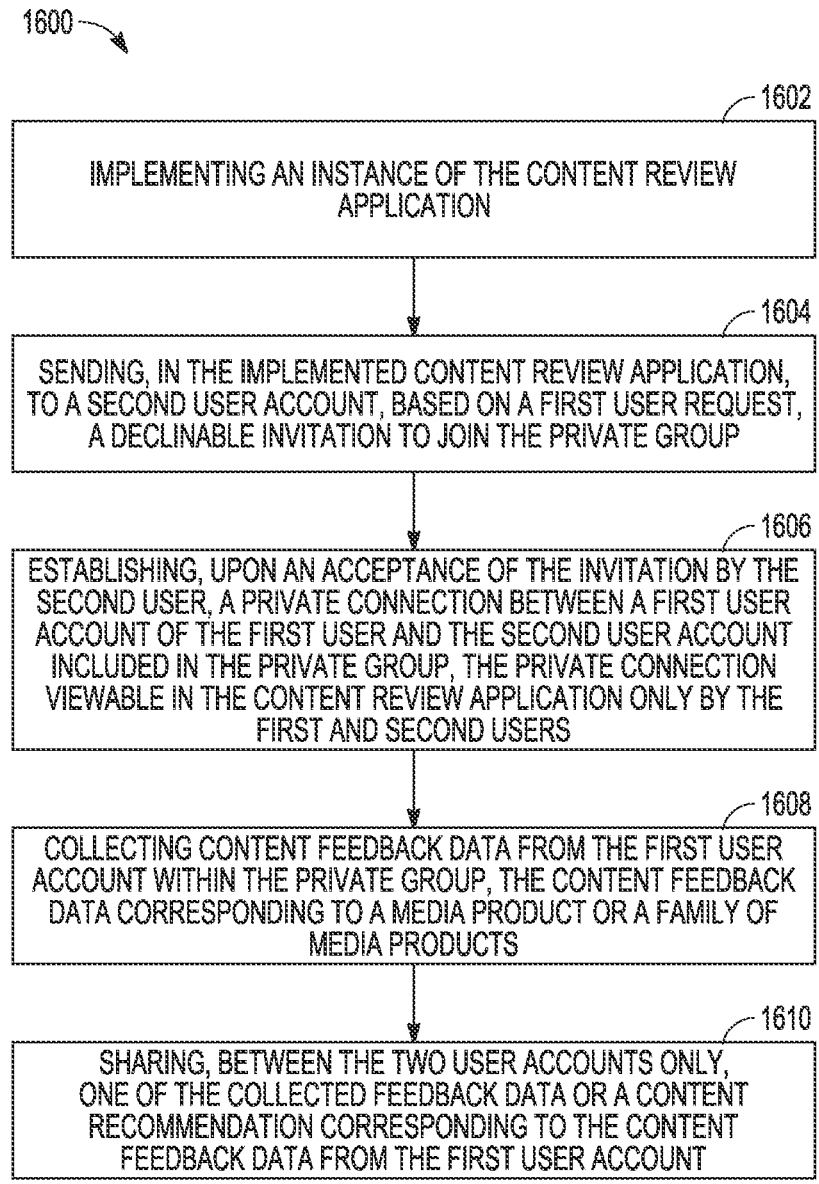
FIG. 16 is a flowchart illustrating operations of a system performing a method of sharing content, according to some example embodiments.

FIG. 16 is a flowchart illustrating operations of the content review application server 110 in performing a method 1600 of sharing content. The method 1600 may include generating a set of recommendations for a set of data objects based on user interactions with those data objects from a plurality of users, according to some example embodiment. Operations in the method 1600 may be performed by the content review application server 110, using modules described above with respect to FIG. 2.

In some examples, a method 1600 of sharing content within a private group using an online content review application comprises: at operation 1602, implementing an instance of the content review application; at operation 1604, sending, in the implemented content review application, to a second user account, based on a first user request, a declinable invitation to join the private group; at operation 1606, establishing, upon an acceptance of the invitation by the second user, a private connection between a first user account of the first user and the second user account included in the private group, the private connection viewable in the content review application only by the first and second users; at operation 1608, collecting content feedback data from the first user account within the private group, the content feedback data corresponding to a media product or a family of media products; and, at operation 1610, sharing, between the two user accounts only, one of the collected feedback data or a content recommendation corresponding to the content feedback data from the first user account.

In some examples, the method 1600 further comprises collecting content consumption data including an index of media products at least partially consumed by the first user account within the private group; and prompting the first user account to provide content feedback data for each media product or a family of media products included in the index.

In some examples, collecting the content feedback data includes receiving a classification or ranking of at least one media product from the first user account.

In some examples, the content consumption data is collected or scraped from a plurality of content providers.

In some examples, the method 1600 further comprises providing a user-searchable index of media product signifiers to the first user account within the private group, wherein collecting the content feedback data includes receiving a classification of at least one media product signifier from the first user account.

In some examples, content feedback data is exclusively shared between two or more user accounts within the private group and not shared with user accounts outside of the private group.

In some examples, the method 1600 further comprises incentivizing the first user account to provide content feedback data for each media product or a family of media products, the incentivizing including providing one of monetary rewards, application-based currency units, application-based permissions, and user account awards in exchange for providing content feedback data.

In some examples, the method 1600 further comprises collecting content feedback data from the second user account within the private group, the content feedback data corresponding to a media product or a family of media products; sharing, between the two user accounts only, one of the collected feedback data or a content recommendation corresponding to the content feedback data from the second user account; and prompting, based on correlation of respective collected feedback data from the first and second user accounts, a content consumption event for the first and second user accounts.

In some examples, establishing a private connection between the first and second user accounts includes: prompting, in the implemented instance of the content review application, the first or second user account to send an invitation message to a plurality of contacts within a contacts index of the first or second user account; receiving from the first or second user account a selection of contacts from the contacts index for invitation; generating a personalized invitation message for an individual contact within the selected contacts from the contacts index, the invitation message including instructions to join the private group; and sending, via a private messaging service, the personalized invitation to the individual contact.

In some examples, a method of sharing content within a private group comprises: establishing a private connection between two individual user accounts included in the private group, without establishing or making public the private connection to a plurality of other individual user accounts included in the private group; collecting content feedback data from a first user account within the private group, the content feedback data corresponding to a media product or a family of media products; and sharing, based on a first user request, to at least one of the other individual user accounts included in the private group, at least one of the collected feedback data or a content recommendation corresponding to the collected content feedback data from the first user account.

In some examples, the sharing includes prompting the first user account to select or deselect at least one of the other individual user accounts to receive the collected feedback data or a content recommendation.

In some examples, prompting the first user account to select or deselect at least one of a plurality of candidate accounts occurs contemporaneously, concurrently, or simultaneously with collecting the content feedback data from the first user account.

In some examples, the method further comprises: collecting content feedback data from a second user account within the private group, the content feedback data corresponding to a media product or a family of media products; and sharing, based on a second user request, to at least one of the other individual user accounts included in the private group, at least one of the collected feedback data or a content recommendation corresponding to the content feedback data collected from the second user account.

In some examples, the sharing includes prompting the second user account to select or deselect at least one of the other individual user accounts to receive the collected feedback data or a content recommendation.

In some embodiments, the organization module 240 of the content review application server 110 can additionally determine tie strengths between two users of the plurality of users, adjusting a tie strength between categories, items, or other data objects, based on the tie strength between the users interacting with those categories, items, or other data objects. For example, tie strengths indicative of interactions of a first user with two or more categories may be weighted differently for a second user than a third user based on a tie strength between the first user and the second user. In such a situation, the content review application server 110 can rank, weigh, or otherwise prioritize the tie strength between the two or more categories more heavily for the second user where the tie strength between the first user and the second user is stronger than the tie strength between the first user and the third user. By way of further example, if the user 132 watches twelve items in an Art category, in the streaming content platform 180, a category-centric graph between the nodes (e.g., the user 132 and the Art category), can have a weight of twelve. Additionally, an item-centric graph can be created for each user (e.g., the user 132 and the user 142) with weights being determined by a number of interactions each user has had with each item. Interactions can be further weighted to make results more or less expansive for the user.

In some embodiments using one or more graphs, the organization module 240 of the content review application server 110 can include users and categories as nodes of the one or more graphs in its determination of the association strength between data objects. For example, the content review application server 110 can use an ego-centric social network graph in its determination where the user 132 is the center node. The ego-centric network graph can be used to compute or otherwise determine or generate additional weights to ensure that items or categories with which the user 132 has interacted most frequently or most recently are included in the results returned by the content review application server 110, such as the plurality of recommendations, discussed in greater detail below. The content review application server 110 can also balance the additional weights determined through the ego-centric social network graph, with weights generated in cooperation with other graphs to ensure that the results relating to the ego-centric graph do not dominate the plurality of recommendations.

For example, if the user 132 favorited, or otherwise selected or indicated interest in a media product on the publication system 120, such as a movie or TV series, the content review application server 110 can include the favorited movie as well as other popular movies in the plurality of recommendations. The popularity of the popular movies can be based on or indicated by one or more graphs, other than the ego-centric graph, formed through the multi-level social network analysis and the tie strengths of the items in those one or more graphs. However, in at least some embodiments, the returned favorited movie and other popular movies may not exclusively dominate the plurality of recommendations. For example, other items such as actors, artists, soundtracks, screen writers, directors, or other information may be equally valid for the user 132, despite the possibility that these items are in disparate categories across the publication system 120. The disparate categories can be low-level categories within a hierarchically ordered category scheme. Disparate categories can thereby share same or similar top- or higher-level categories (e.g., horror genre).

For example, when using "horror" as the category, results generated by the content review application server 110 can be expansive (e.g., showing multiple different horror related items) but still relevant, by excluding items from unrelated categories such as "documentary."

The plurality of recommendations can include data objects from a plurality of data object clusters of the set of data object clusters. In some embodiments, the plurality of data object clusters can be based on user interactions, from the set of user interactions, associated with the first user. For example, the plurality of data objects presented to the user 132 may be at least in part representative of user interactions of the user 132.

Figure 17:
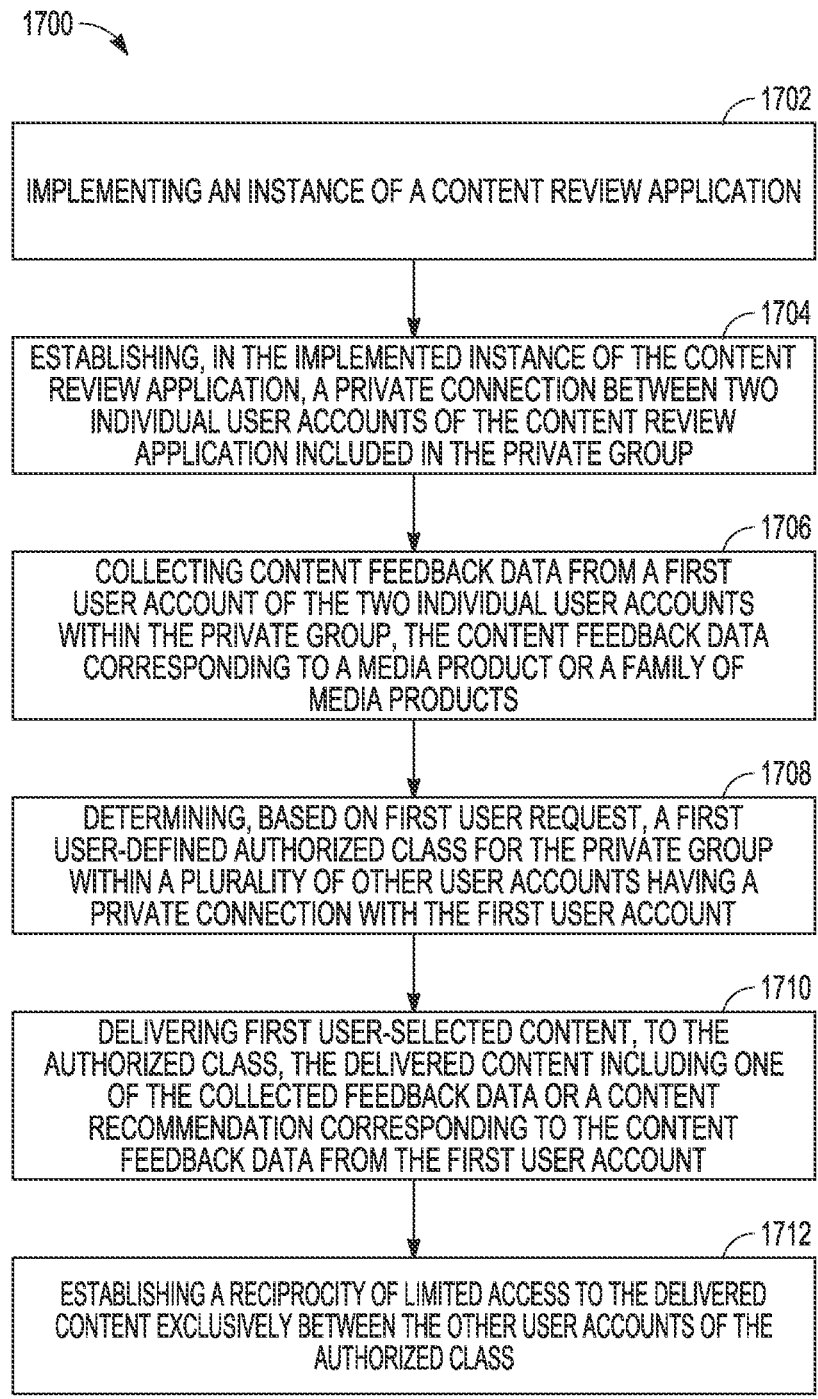
FIG. 17 is a flowchart illustrating operations of a system performing a method of sharing content, according to some example embodiments.

FIG. 17 is a flowchart illustrating operation of the content review application server 110 in performing a method 1700 of sharing content. The method 1700 may include generating a set of recommendations for a set of data objects based on user interactions with those data objects from a plurality of users, according to some example embodiments. Operations in the method 1700 may be performed by the content review application server 110 using modules described above with respect to FIG. 2.

In some examples, a method 1700 of sharing content within a private group using a content review application comprises: at operation 1702, implementing an instance of a content review application; at operation 1704, establishing, in the implemented instance of the content review application, a private connection between two individual user accounts of the content review application included in the private group; at operation 1706, collecting content feedback data from a first user account of the two individual user accounts within the private group, the content feedback data corresponding to a media product or a family of media products; at operation 1708, determining, based on first user request, a first user-defined authorized class for the private group within a plurality of other user accounts having a private connection with the first user account; at operation 1710, delivering first user-selected content, to the authorized class, the delivered content including one of the collected feedback data or a content recommendation corresponding to the content feedback data from the first user account; and, at operation 1712, establishing a reciprocity of limited access to the delivered content exclusively between the other user accounts of the authorized class.

In some examples, delivering the content occurs asynchronously with collecting the content feedback data.

In some examples, the method 1700 further comprises: predicting, via an algorithm, a class of the plurality of other user accounts that will be receptive to the collected feedback data or the content recommendation; and impeding delivery to users outside the predicted class.

In some examples, the predicting includes: dynamically indexing respective feedback data from the plurality of other user accounts; and determining, for each user account in the plurality of other user accounts, an index of irrelevant categories based on the respective feedback data.

In some examples, the delivering includes prompting the first user account to select or deselect at least one of a plurality of candidate accounts, each of the candidate accounts having a private connection in the content review application with the first user account, to receive the collected feedback data or the content recommendation.

In some examples, the prompting the first user account to select or deselect at least one of a plurality of candidate accounts occurs contemporaneously, concurrently, or simultaneously with collecting the content feedback data from the first user account.

In some examples, the method 1700 further comprises: collecting content feedback data from a second user account within the private group, the content feedback data corresponding to a media product or a family of media products; and delivering, to a plurality of user accounts having a private connection with the second user account, at least one of the collected feedback data or the content recommendation corresponding to the content feedback data from the second user account.

In some examples, the delivering includes prompting the second user account to select or deselect at least one of a plurality of candidate accounts, each of the candidate accounts having a private connection in the content review application with the first user account, to receive the collected feedback data or a content recommendation.

In some examples, the content review application server 110 or the publication system 120 can retain a log of user interactions for each user. In some embodiments, the receiver module 210 receives sets of historical user interactions from the log for the user 132. For example, the content review application server 110, as described above, generates directed or expansive results. The receiver module 210, receiving sets of historical user interactions from the log, can pass sets of user interactions to the generation module 220 which represent varying periods of time and durations of user interactions. For example, if the user 132 repeatedly interacts with romance related products or items within a category of romance during a recent two-week period, the receiver module 210 receives sets of historical user interactions from that two-week period, or from periods extending beyond the two-week period. In this way, where the receiver module 210 receives a set of historical user interactions from the two-week period, the content review application server 110 can use the set of historical user interactions and adjust weights of the results to generate timely results, at least partially representative of the set of historical user interactions from the two-week period.

Where the user 132 has a sparse history of interaction with the content review application server 110 or the publication system 120, the receiver module 210 can receive sets of historical user interactions which span a greater period of time (e.g., an entire history of the user 132 interacting with the content review application server 110 or the publication system 120). In these embodiments, the receiver module 210, or another module within the content review application server 110, makes a determination of whether to receive sets of user interactions from a short recent duration or a longer historical duration. For example, interaction density, the number of interactions the user 132 has performed on the content review application server 110 or the publication system 120, can be used to determine the time period range or duration of user interactions received by the receiver module 210.

Figure 18:
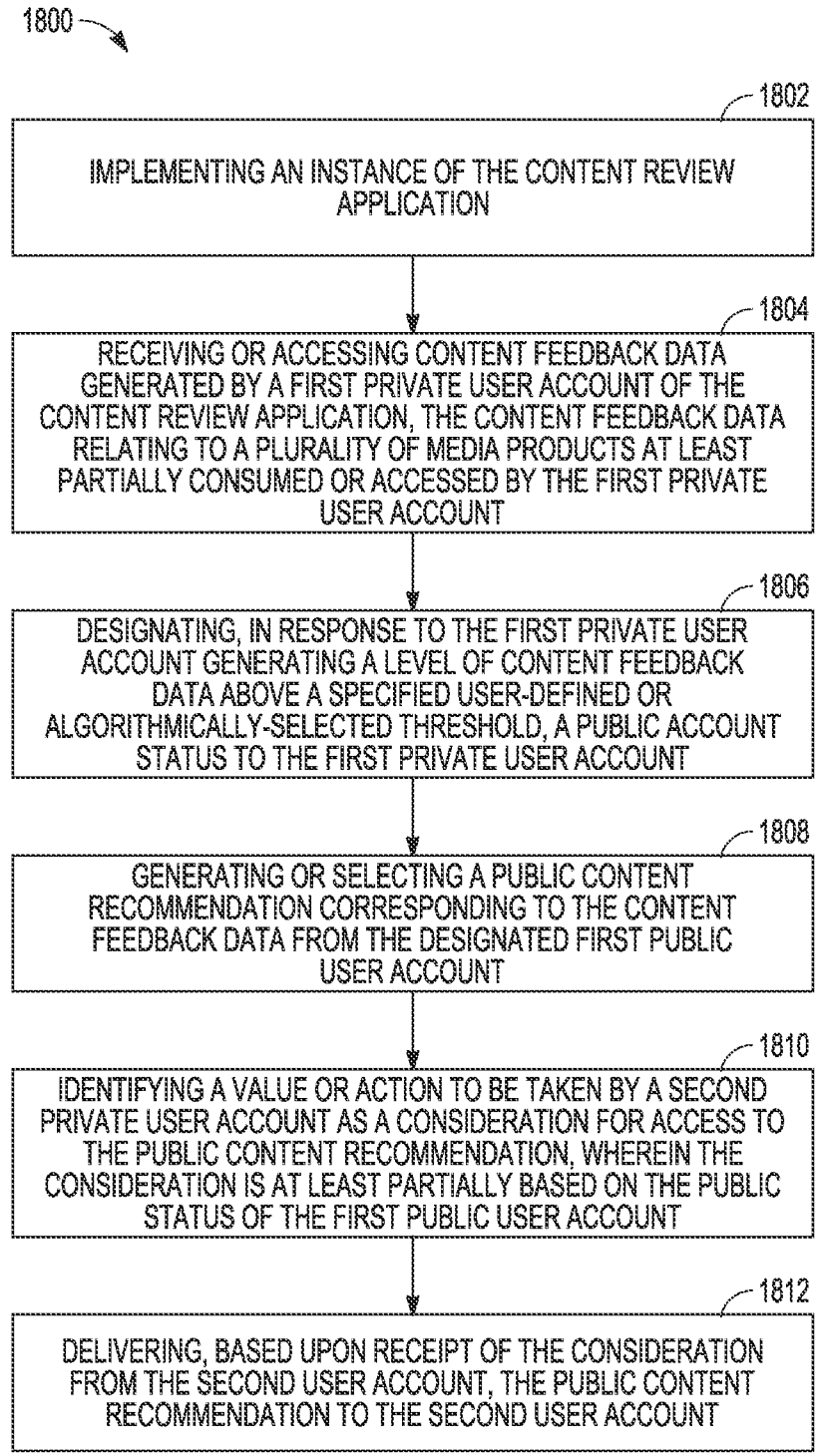
FIG. 18 is a flowchart illustrating operations of a system performing a method of collecting shareable content, according to some example embodiments.

FIG. 18 is a flowchart illustrating operation of the content review application server 110 in performing a method 1800 of sharing content. The method 1800 may include generating a set of recommendations for a set of data objects based on user interactions with those data objects from a plurality of users, according to some example embodiments. Operations in the method 1800 may be performed by the content review application server 110 using modules described above with respect to FIG. 2.

In some examples, a method 1800 of collecting shareable content in an online content review application comprises: at operation 1802, implementing an instance of the content review application; at operation 1804, receiving or accessing content feedback data generated by a first private user account of the content review application, the content feedback data relating to a plurality of media products at least partially consumed or accessed by the first private user account; at operation 1806, designating, in response to the first private user account generating a level of content feedback data above a specified user-defined or algorithmically-selected threshold, a public account status to the first private user account; at operation 1808, generating or selecting a public content recommendation corresponding to the content feedback data from the designated first public user account; at operation 1810, identifying a value or action to be taken by a second private user account as a consideration for access to the public content recommendation, wherein the consideration is at least partially based on the public status of the first public user account; and, at operation 1812, delivering, based upon receipt of the consideration from the second user account, the public content recommendation to the second user account.

In some examples, the operations further comprise establishing, upon request of the first private user account, a private connection between the first and second private user accounts to establish a private content review group in the content review application.

In some examples, the specified threshold is based on a first user of the first private user account providing content feedback data greater than a minimum number of ratings or recommendations of different media products.

In some examples, the specified threshold is based on a consistency of posts by the first private user account, a type or nature of review by the first private user account, a consistency of review by the first private user account with general trends, or a number of users in a private or public group of the content review application.

In some examples, the operations further comprise displaying the public account status of the first public user account to the second private user account before receiving the consideration from the second user account in exchange for the content recommendation.

In some examples, the operations further comprise identifying, based on embedded metadata, a first category label of the media product at least partially consumed by the first private user account; generating an index of irrelevant categories for the second private user account, generating the index including identifying an index of media products corresponding with negative content feedback data from the second private user account; identifying, based on embedded metadata, a respective category label for each of the media products corresponding with negative content feedback data from the second private user account; and determining whether an amount of identified category labels the media products corresponding with negative content feedback data from the second private user account exceeds a predetermined threshold amount for that category; and determining whether the first category label of the media product at least partially consumed by the first private user account corresponds with a category included in the index of irrelevant categories for the second user account; and impeding, upon determining that the first category label corresponds with a category included in the index of irrelevant categories, generation of a content recommendation corresponding to the content feedback data from the first private user account or the designated first public user account.

One or more of the methodologies described herein may obviate a need for certain efforts or resources that otherwise would be involved in generating, aggregating and relating data objects in a non-transitory machine-readable storage medium and translating the relations of the data objects into recommendations for a user, and thereby reducing a number of search iterations, or linking, or associating operations that a computer system may need to perform, saving processing cycles of the content review application server 110, the user device 130 or 140, and the publication system 120. Further, methodologies described herein may generate both expansive recommendations and personalized, goal-oriented recommendations based on an analysis of user interactions across a social network. For example, the methods and systems presented herein may perform operations of weighting associations and clusters for relevance to a user. The systems and methods may take into account a plurality of contexts and types of relationships in generating recommendations for users and forming associations between data objects. Efforts expended by a user in researching products, browsing for products, performing recommendations or browsing activities, and the like may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Some examples incorporate recommendations from a circle of friends to help an individual choose content for viewing. Some examples include an integrated social media layer to further build immersion and interaction around recommended content. Some examples are configured to be used across streaming and other content platforms but could also be used to find content within a streaming platform. Some examples provide users only with content that their selected friends choose to rate and share with them and capitalize on the concept that like-minded friends are likely to have similar tastes in content and will therefore make the best and most relevant recommendation.

Some examples enable a user to curate or receive a prioritized list of content as recommendation for viewing. Recommendations can be supplemented with notes on the content from in-group users and a dialogue can be created around a piece of content from multiple users. In addition, watch parties can be organized and social interaction facilitated around watch parties. In some examples, a one-on-one link is established between a first user (an inviter) and a second user (an invitee). Notwithstanding establishment of the one-on-one link, the second user (invitee) does not get to see, at least initially, data from other members of user 1's (the inviter's) group. An example content review application allows the first user and the second user to see all the posts each of them make. In some examples, the first user can determine to not share all posts with the second user based on some criteria.

Some examples facilitate user remembrance of content by automatically scraping what an individual user may have watched across streaming and other content providers. Users can begin a subscription process by logging into their respective streaming accounts either upon account creation or later in the account settings section. Once content history is scraped, users can then, with one click, rate the populated content and choose to share or not share what they have watched, and the rating with the group. Users can also manually search for and add content ratings for sharing or for personal history. In some examples, an app has integrated technology to enable a user to search for content, and after a few keystrokes will identify where the content is available and provide synopsis and other ratings. The content can then be accessed through the service as well via an embedded link. Some examples automatically display a user's contact list and allow the user, with a few clicks, to send out invitations to selected users to download the app and allow the user to write a message to be included with the invitation. Each invitee who downloads the app then becomes part of the invitation originators circle and can see what the originator is watching, but can't see or access what the rest of the circle is watching. The invitee can then set up their own circle that is unique to them with the invitation originator being the first member of the new circle. Users can then set up additional circles as desired with any members they so choose.

Some examples enable user-initiated group selection and curation of a group such as a Critics Club in a one on one, selective manner. Establishment of a closed user relationship creates a private two-way (reciprocal) visibility into the user's respective reviews and recommendations. Requests to join the group may be accepted or declined, and invitations to join and responses thereto are hidden, especially if declined. Examples enable selective exportation and/or distribution of links to recommended content, thereby facilitating, and promoting an exchange of reviews and accessed content. Some examples enable a sorting of a user's home feed based on membership.

Some examples enable designation of a power user based on various factors to qualify. The designation is selective and is declinable. A power designation can expand reciprocity, in other words access it is not necessary for a user to be in a user group to open or access power reviews or public postings. Interactions with power users can be monetized, using various considerations or items of value, such as ad support, subscription fees, or other methods.

Figure 19:
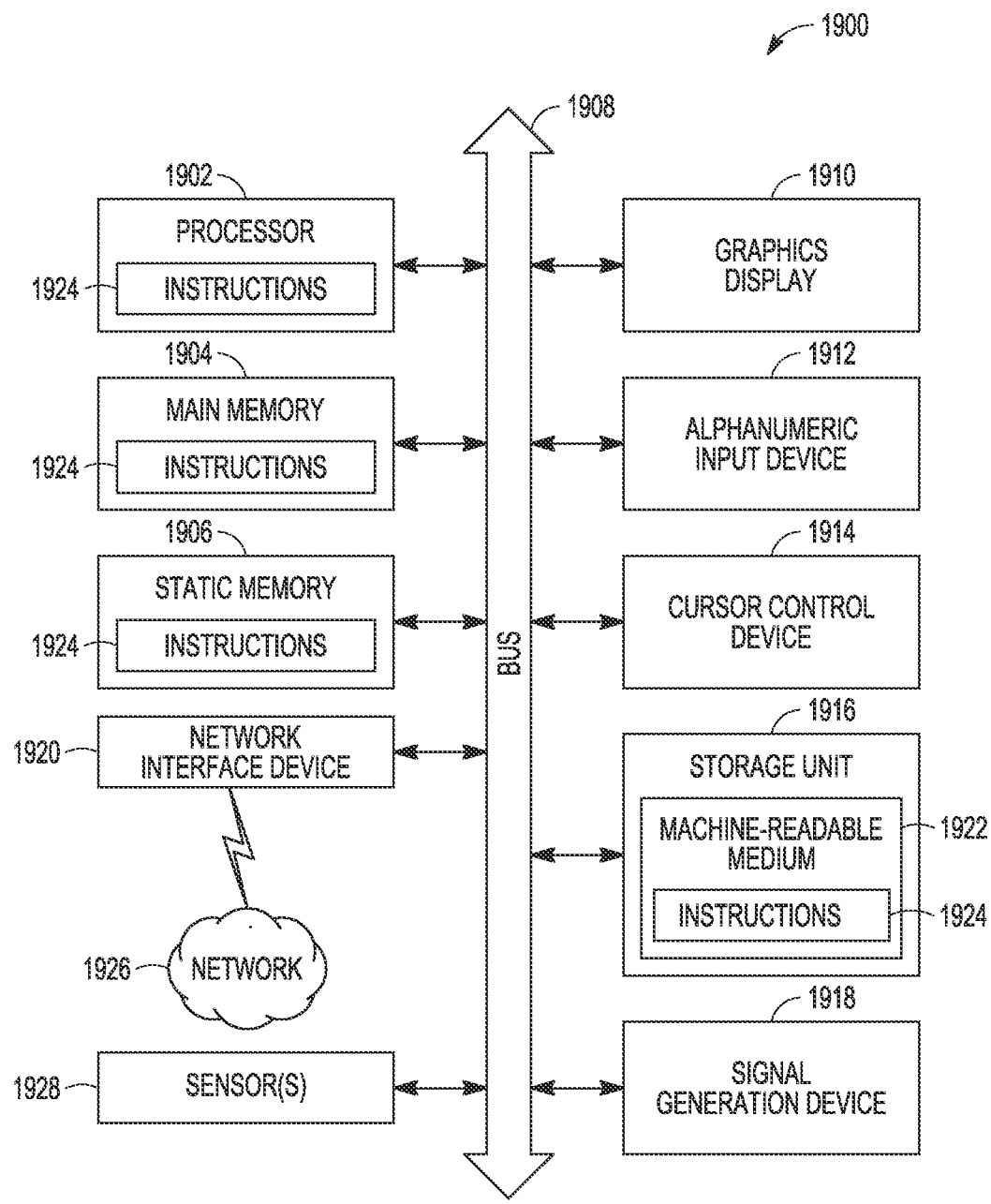
FIG. 19 is a block diagram illustrating components of a machine, according to some example embodiments, able to read instructions from a machine-readable medium and perform any one or more of the methodologies discussed herein.

FIG. 19 is a block diagram illustrating components of a machine 1900, according to some example embodiments, able to read instructions 1924 from a machine-readable medium 1922 (e.g., a non-transitory machine-readable medium, a machine-readable storage medium, a computer-readable storage medium, or any suitable combination thereof) and perform any one or more of the methodologies discussed herein, in whole or in part. Specifically, FIG. 19 shows the machine 1900 in the example form of a computer system (e.g., a computer) within which the instructions 1924 (e.g., software, a program, an application, an applet, an app, or other executable code) for causing the machine 1900 to perform any one or more of the methodologies discussed herein may be executed, in whole or in part. For example, the instructions 1924 can be processor executable instructions that, when executed by a processor of the machine 1900, cause the machine 1900 to perform the operations outlined above.

In alternative embodiments, the machine 1900 operates as a standalone device or may be communicatively coupled (e.g., networked) to other machines. In a networked deployment, the machine 1900 may operate in the capacity of a server machine or a client machine in a server-client network environment, or as a peer machine in a distributed (e.g., peer-to-peer) network environment. The machine 1900 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1924, sequentially or otherwise, that specify actions to be taken by that machine. Further, while only a single machine is illustrated, the term "machine" shall also be taken to include any collection of machines that individually or jointly execute the instructions 1924 to perform all or part of any one or more of the methodologies discussed herein.

The machine 1900 includes a processor 1902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1904, and a static memory 1906, which are configured to communicate with each other via a bus 1908. The processor 1902 may contain microcircuits that are configurable, temporarily or permanently, by some or all of the instructions 1924 such that the processor 1902 is configurable to perform any one or more of the methodologies described herein, in whole or in part. For example, a set of one or more microcircuits of the processor 1902 may be configurable to execute one or more modules (e.g., software modules) described herein.

The machine 1900 may further include a graphics display 1910 (e.g., a plasma display panel (PDP), a light emitting diode (LED) display, a liquid crystal display (LCD), a projector, a cathode ray tube (CRT), or any other display capable of displaying graphics or video). The machine 1900 may also include an alphanumeric input device 1912 (e.g., a keyboard or keypad), a cursor control device 1914 (e.g., a mouse, a touchpad, a trackball, a joystick, a motion sensor, an eye tracking device, or other pointing instrument), a storage unit 1916, an audio generation device 1918 (e.g., a sound card, an amplifier, a speaker, a headphone jack, any suitable combination thereof, or any other suitable signal generation device), and a network interface device 1920.

The storage unit 1916 includes the machine-readable medium 1922 (e.g., a tangible and non-transitory machine-readable storage medium) on which are stored the instructions 1924, embodying any one or more of the methodologies or functions described herein. The instructions 1924 may also reside, completely or at least partially, within the main memory 1904, within the processor 1902 (e.g., within the processor's cache memory), or both, before or during execution thereof by the machine 1900. Accordingly, the main memory 1904 and the processor 1902 may be considered machine-readable media (e.g., tangible and non-transitory machine-readable media). The instructions 1924 may be transmitted or received over the network 1926 (or the network 150) via the network interface device 1920. For example, the network interface device 1920 may communicate the instructions 1924 using any one or more transfer protocols (e.g., Hypertext Transfer Protocol (HTTP)).

In some example embodiments, the machine 1900 may be a portable computing device, such as a smart phone or tablet computer, and have one or more additional input components (e.g., sensors 1928 or gauges). Examples of the additional input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1922 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1924 for execution by the machine 1900, such that the instructions 1924, when executed by one or more processors of the machine 1900 (e.g., processor 1902), cause the machine 1900 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Furthermore, the tangible machine-readable medium is non-transitory in that it does not embody a propagating signal. However, labeling the tangible machine-readable medium as "non-transitory" should not be construed to mean that the medium is incapable of movement, but rather the medium should be considered as being transportable from one physical location to another. Additionally, since the machine-readable medium is tangible, the medium may be considered to be a machine-readable device.

Figure 20:
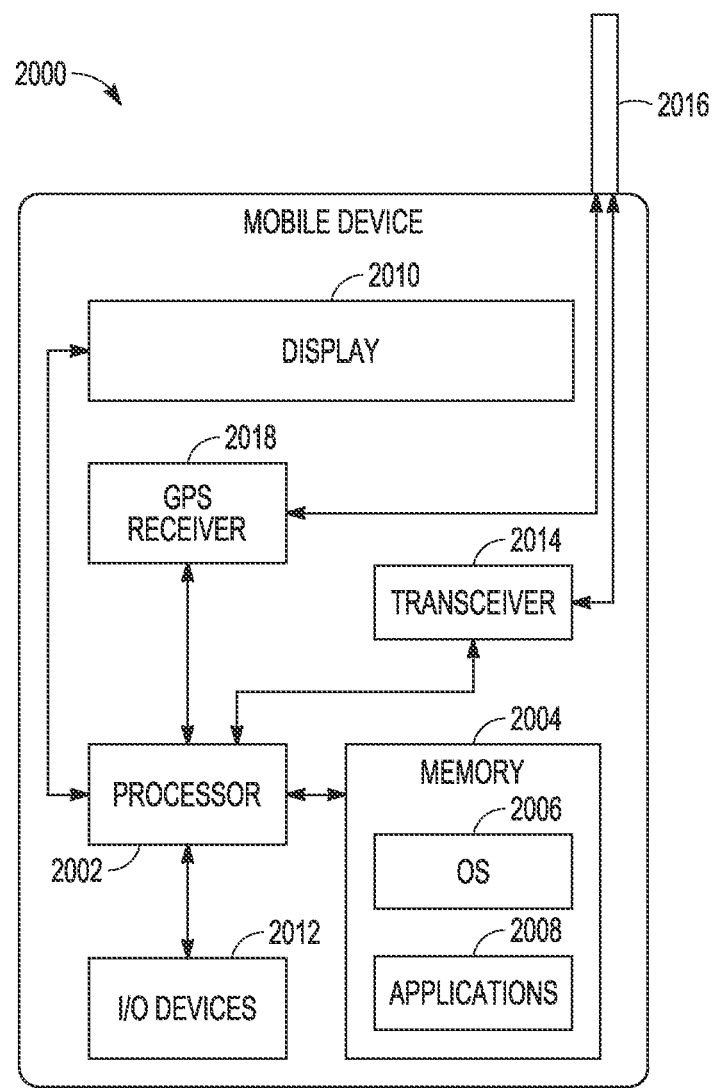
FIG. 20 is a block diagram illustrating components of a mobile device according to some example embodiments, able to read instructions from a machine-readable medium and perform any one or more of the methodologies discussed herein.

FIG. 20 is a block diagram illustrating a mobile device 2000, according to some example embodiments. The mobile device 2000 can be an implementation of the user device 130 or 140 of FIG. 1. In some embodiments, the mobile device 2000, in communication with the content review application server 110 of FIG. 1 can perform some of the methodologies described herein and can provide input from the user 132 or 142 of FIG. 1 to the content review application server 110. For example, the mobile device 2000 may be an implementation of the user device 130 of FIG. 1. The mobile device 2000 can include a processor 2002. The processor 2002 can be any of a variety of different types of commercially available processors suitable for mobile devices 2000 (for example, an XScale architecture microprocessor, a Microprocessor without Interlocked Pipeline Stages (MIPS) architecture processor, or another type of processor). A memory 2004, such as a random-access memory (RAM), a Flash memory, or other type of memory, is typically accessible to the processor 2002. The memory 2004 can be adapted to store an operating system (OS) 2006, as well as application programs 2008, such as a mobile location enabled application that can provide location-based services to a user. The processor 2002 can be coupled, either directly or via appropriate intermediary hardware, to a display 2010 and to one or more input/output (I/O) devices 2012, such as a keypad, a touch panel sensor, a microphone, and the like. Similarly, in some example embodiments, the processor 2002 can be coupled to a transceiver 2014 that interfaces with an antenna 2016. The transceiver 2014 can be configured to both transmit and receive cellular network signals, wireless data signals, or other types of signals via the antenna 2016, depending on the nature of the mobile device 2000. Further, in some configurations, a GPS receiver 2018 can also make use of the antenna 2016 to receive GPS signals.

The mobile device 2000 can be configured to perform at least a portion of any one or more of the methodologies discussed herein. For example, the memory 2004 of the mobile device 2000 may include instructions comprising a portion of one or more of the receiver modules 210, the generation modules 220, the identification modules 230, the organization modules 240, and the presentation modules 250. For example, one or more of the modules described above can be distributed between the content review application server 110 and the mobile device 2000 to perform one or more of the operations outlined above with respect to each module. The modules can configure the processor 2002 of the mobile device 2000 to perform one or more of the operations outlined above with respect to each module. In some embodiments, the mobile device 2000 and the machine 1900 of FIG. 19 can each store at least a portion of the modules discussed above and cooperate to perform the methods described above, as will be explained in more detail below.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method of sharing content within a private group using a content review application, the method comprising:
    implementing an instance of a content review application;
    establishing, in the implemented instance of the content review application, a private connection between first and second individual user accounts of the content review application included in the private group, the first and second individual user accounts characterized by a generic, non-power user account status;
    collecting content feedback data from a first user account of the first and second individual user accounts within the private group, the content feedback data including at least one rating or classification and corresponding to a audiovisual production or a family of audiovisual productions;
    determining, based on first user request, a first user-defined authorized class for the private group within a plurality of other user accounts having a private connection with the first user account;
    delivering first user-selected content, to the authorized class, the delivered first content including one of the collected feedback data or a content recommendation corresponding to the content feedback data from the first user account;

establishing a reciprocity of limited access to the delivered first content exclusively between the other user accounts of the authorized class; and establishing, in the implemented instance of the content review application, a public connection between the two individual user accounts and a third user account, wherein the third user account is characterized by a power user account status and the first and second user accounts are permitted to receive second content from the third user account and non-exclusively between user accounts of an authorized class.

2. The method of claim 1, wherein delivering the first content occurs asynchronously with collecting the content feedback data.

3. The method of claim 1, further comprising:
predicting, via an algorithm, a class of the plurality of other user accounts that will be receptive to the collected feedback data or the content recommendation; and
impeding delivery to users outside the predicted class.

4. The method of claim 3, wherein predicting includes:
dynamically indexing respective feedback data from the plurality of other user accounts; and
determining, for each user account in the plurality of other user accounts, an index of irrelevant categories based on the respective feedback data.

5. The method of claim 1, wherein the delivering includes prompting the first user account to select or deselect at least one of a plurality of candidate accounts, each of the candidate accounts having a private connection in the content review application with the first user account, to receive the collected feedback data or the content recommendation.

6. The method of claim 5, wherein prompting the first user account to select or deselect at least one of a plurality of candidate accounts occurs contemporaneously, concurrently, or simultaneously with collecting the content feedback data from the first user account.

7. The method of claim 1, further comprising:
collecting content feedback data from a second user account within the private group, the content feedback data corresponding to a audiovisual production or a family of audiovisual productions; and
delivering, to a plurality of user accounts having a private connection with the second user account, at least one of the collected feedback data or the content recommendation corresponding to the content feedback data from the second user account.

8. The method of claim 7, wherein the delivering includes prompting the second user account to select or deselect at least one of a plurality of candidate accounts, each of the candidate accounts having a private connection in the content review application with the first user account, to receive the collected feedback data or a content recommendation.

9. A system comprising:
one or more computer processors; and
one or more computer-readable mediums storing instructions that, when executed by the one or more computer processors, cause the system to perform operations comprising:
implementing an instance of a content review application;
establishing, in the implemented instance of the content review application, a private connection between first and second individual user accounts of the content review application included in a private group, the first and second individual user accounts characterized by a generic, non-power user account status;

collecting content feedback data from a first user account of the first and second individual user accounts within a private group, the content feedback data including at least one rating or classification and corresponding to a audiovisual production or a family of audiovisual productions;
determining, based on first user request, a first user-defined authorized class for the private group within a plurality of other user accounts having a private connection with the first user account;
delivering first user-selected content, to the authorized class, the delivered first content including one of the collected feedback data or a content recommendation corresponding to the content feedback data from the first user account;
establishing a reciprocity of limited access to the first delivered content exclusively between the other user accounts of the authorized class; and
establishing, in the implemented instance of the content review application, a public connection between the two individual user accounts and a third user account, wherein the third user account is characterized by a power user account status and the first and second user accounts are permitted to receive second content from the third user account and non-exclusively between user accounts of an authorized class.

10. The system of claim 9, wherein delivering the content occurs asynchronously with collecting the content feedback data.

11. The system of claim 9, wherein the operations further comprise:
predicting, via an algorithm, a class of the plurality of other user accounts that will be receptive to the collected feedback data or the content recommendation; and
impeding delivery to users outside the predicted class.

12. The system of claim 11, wherein the predicting includes:
dynamically indexing respective feedback data from the plurality of other user accounts; and
determining, for each user account in the plurality of other user accounts, an index of irrelevant categories based on the respective feedback data.

13. The system of claim 9, wherein the delivering includes prompting the first user account to select or deselect at least one of a plurality of candidate accounts, each of the candidate accounts having a private connection in the content review application with the first user account, to receive the collected feedback data or the content recommendation.

14. The system of claim 13, wherein prompting the first user account to select or deselect at least one of a plurality of candidate accounts occurs contemporaneously, concurrently, or simultaneously with collecting the content feedback data from the first user account.

15. The system of claim 9, wherein the operations further comprise:
collecting content feedback data from a second user account within the private group, the content feedback data corresponding to a audiovisual production or a family of audiovisual productions; and
delivering, to a plurality of user accounts having a private connection with the second user account, at least one of the collected feedback data or the content recommendation corresponding to the content feedback data from the second user account.

16. The system of claim 15, wherein the delivering includes prompting the second user account to select or deselect at least one of a plurality of candidate accounts, each of the candidate accounts having a private connection in the content review application with the first user account, to receive the collected feedback data or a content recommendation.

17. A non-transitory machine-readable medium storing instructions which, when executed by a machine, cause the machine to perform operations comprising:
   implementing an instance of a content review application;
   establishing, in the implemented instance of the content review application, a private connection between first and second individual user accounts of the content review application included in a private group, the first and second individual user accounts characterized by a generic, non-power user account status;
   collecting content feedback data from a first user account of the first and second individual user accounts within the private group, the content feedback data including at least one rating or classification and corresponding to a audiovisual production or a family of audiovisual productions;
   determining, based on first user request, a first user-defined authorized class for the private group within a plurality of other user accounts having a private connection with the first user account;
   delivering first user-selected content, to the authorized class, the delivered first content including one of the collected feedback data or a content recommendation corresponding to the content feedback data from the first user account; and
   establishing a reciprocity of limited access to the delivered first content exclusively between the other user accounts of the authorized class; and
   establishing, in the implemented instance of the content review application, a public connection between the two individual user accounts and a third user account, wherein the third user account is characterized by a power user account status and the first and second user accounts are permitted to receive second content from the third user account and non-exclusively between user accounts of an authorized class.

18. The medium of claim 17, wherein delivering the content occurs asynchronously with collecting the content feedback data.

19. The medium of claim 18, wherein the operations further comprise:
   predicting, via an algorithm, a class of the plurality of other user accounts that will be receptive to the collected feedback data or the content recommendation; and
   impeding delivery to users outside the predicted class.

20. The medium of claim 19, wherein the predicting includes:
   dynamically indexing respective feedback data from the plurality of other user accounts; and
   determining, for each user account in the plurality of other user accounts, an index of irrelevant categories based on the respective feedback data.

* * * * *